US010141593B2

(12) United States Patent
Pintauro et al.

(10) Patent No.: US 10,141,593 B2
(45) Date of Patent: Nov. 27, 2018

(54) COMPOSITE MEMBRANES, METHODS OF MAKING SAME, AND APPLICATIONS OF SAME

(71) Applicant: VANDERBILT UNIVERSITY, Nashville, TN (US)

(72) Inventors: Peter N. Pintauro, Brentwood, TN (US); Andrew Park, Nashville, TN (US); Jason Ballengee, Cedar Hill, TX (US)

(73) Assignee: VANDERBILT UNIVERSITY, Nashville, TN (US)

( * ) Notice: Subject to any disclaimer, the term of this patent is extended or adjusted under 35 U.S.C. 154(b) by 158 days.

(21) Appl. No.: 15/161,838

(22) Filed: May 23, 2016

(65) Prior Publication Data

US 2016/0380296 A1  Dec. 29, 2016

Related U.S. Application Data

(60) Continuation-in-part of application No. 13/567,857, filed on Aug. 6, 2012, now Pat. No. 9,350,036, and a (Continued)

(51) Int. Cl.
*H01M 8/10* (2016.01)
*H01M 8/1004* (2016.01)
(Continued)

(52) U.S. Cl.
CPC .......... *H01M 8/1004* (2013.01); *B29C 43/02* (2013.01); *B29C 71/02* (2013.01); *C08J 5/2268* (2013.01); *D01D 5/0038* (2013.01); *D01F 6/52* (2013.01); *H01M 8/103* (2013.01); *H01M 8/109* (2013.01); *H01M 8/1023* (2013.01);

(Continued)

(58) Field of Classification Search
CPC .... H01M 8/10; H01M 8/1004; H01M 8/1025; H01M 8/1027; H01M 8/103; H01M 8/1032; H01M 8/1039; H01M 8/1044; H01M 8/1081; H01M 8/1086; H01M 8/1088; H01M 8/1093
See application file for complete search history.

(56) References Cited

PUBLICATIONS

Choi S.W. et al., Nafion-impregnated electrospun polyvinylidene fluoride composite membranes for direct methanol fuel cells, Journal of Power Sources 180 (2008) 167-171.*

* cited by examiner

*Primary Examiner* — Karie O'Neill Apicella
(74) *Attorney, Agent, or Firm* — Locke Lord LLP; Tim Tingkang Xia, Esq.

(57) ABSTRACT

A method of fabricating a composite membrane, includes the steps of: forming a first solution comprising a charged polymer and a first uncharged polymer having a repeat unit of a formula of:

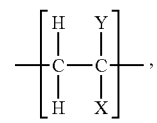

where each of X and Y is a non-hydroxyl group; forming a second solution comprising a second uncharged polymer; electrospinning, separately and simultaneously, the first solution and the second solution to form a dual fiber mat; and processing the dual fiber mat to form the composite membrane.

8 Claims, 11 Drawing Sheets

Related U.S. Application Data continuation-in-part of application No. 14/964,220, filed on Dec. 9, 2015, now Pat. No. 9,876,246, which is a division of application No. 13/872,953, filed on Apr. 29, 2013, now Pat. No. 9,252,445, and a continuation-in-part of application No. 13/567,857, filed on Aug. 6, 2012, now Pat. No. 9,350,036, and a continuation-in-part of application No. 13/823,968, filed on Mar. 15, 2013, now Pat. No. 9,905,870, said application No. 14/964,220 is a continuation-in-part of application No. 13/567,857, filed on Aug. 6, 2012, now Pat. No. 9,350,036, and a continuation-in-part of application No. 13/823,968, filed as application No. PCT/US2011/058088 on Oct. 27, 2011, now Pat. No. 9,905,870.

(60) Provisional application No. 61/407,332, filed on Oct. 27, 2010, provisional application No. 61/515,804, filed on Aug. 5, 2011, provisional application No. 61/800,884, filed on Mar. 15, 2013.

(51) Int. Cl.

| | | |
|---|---|---|
| *H01M 8/1027* | (2016.01) | |
| *H01M 8/1025* | (2016.01) | |
| *H01M 8/1044* | (2016.01) | |
| *H01M 8/1081* | (2016.01) | |
| *H01M 8/1086* | (2016.01) | |
| *H01M 8/1088* | (2016.01) | |
| *H01M 8/103* | (2016.01) | |
| *H01M 8/1039* | (2016.01) | |
| *H01M 8/1032* | (2016.01) | |
| *D01D 5/00* | (2006.01) | |
| *D01F 6/52* | (2006.01) | |
| *B29C 43/02* | (2006.01) | |
| *B29C 71/02* | (2006.01) | |
| *C08J 5/22* | (2006.01) | |
| *H01M 8/1023* | (2016.01) | |
| *H01M 8/1053* | (2016.01) | |
| *H01M 8/1067* | (2016.01) | |
| *H01M 8/1018* | (2016.01) | |
| *B29L 31/34* | (2006.01) | |
| *B29K 27/00* | (2006.01) | |

(52) U.S. Cl.
CPC ....... *H01M 8/1025* (2013.01); *H01M 8/1027* (2013.01); *H01M 8/1032* (2013.01); *H01M 8/1039* (2013.01); *H01M 8/1044* (2013.01); *H01M 8/1053* (2013.01); *H01M 8/1067* (2013.01); *H01M 8/1081* (2013.01); *H01M 8/1088* (2013.01); *H01M 8/1093* (2013.01); *B29C 2071/022* (2013.01); *B29K 2027/16* (2013.01); *B29L 2031/3468* (2013.01); *C08J 2341/00* (2013.01); *C08J 2427/16* (2013.01); *C08J 2471/02* (2013.01); *C08J 2481/06* (2013.01); *H01M 2008/1095* (2013.01); *H01M 2250/20* (2013.01); *H01M 2300/0082* (2013.01); *H01M 2300/0091* (2013.01); *H01M 2300/0094* (2013.01); *Y02E 60/521* (2013.01); *Y02P 70/56* (2015.11); *Y02T 90/32* (2013.01)

COMPOSITE MEMBRANES, METHODS OF MAKING SAME, AND APPLICATIONS OF SAME

CROSS-REFERENCE TO RELATED PATENT APPLICATIONS

This application is a continuation-in-part application of U.S. application Ser. No. 13/567,857, filed Aug. 6, 2012, which itself claims priority to and the benefit of, pursuant to 35 U.S.C. § 119(e), U.S. provisional patent application Ser. No. 61/515,804, filed Aug. 5, 2011.

This application also is a continuation-in-part of U.S. application Ser. No. 14/964,220 (hereinafter the '220 Application), filed Dec. 9, 2015. The '220 Application is a divisional application of U.S. patent application Ser. No. 13/872,953 (hereinafter the '953 Application), filed Apr. 29, 2013, now patented with U.S. Pat. No. 9,252,445. The '953 Application claims the benefit, pursuant to 35 U.S.C. § 119(e), of U.S. provisional patent application Ser. No. 61/800,884, filed Mar. 15, 2013, and is also a continuation-in-part of U.S. patent application Ser. Nos. 13/567,857 and 13/823,968, filed Aug. 6, 2012 and Mar. 15, 2013, respectively. The '220 Application also is a continuation-in-part of U.S. patent application Ser. No. 13/567,857, filed Aug. 6, 2012. The '220 Application also is a continuation-in-part of U.S. patent application Ser. No. 13/823,968, filed Mar. 15, 2013, which is a U.S. national stage application under 35 U.S.C. § 371 of PCT patent application Ser. No. PCT/US11/58088, filed Oct. 27, 2011, which itself claims the benefit, pursuant to 35 U.S.C. § 119(e), of U.S. provisional patent application Ser. No. 61/407,332, filed Oct. 27, 2010.

All the above disclosures of which are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [1] represents the 4th reference cited in the reference list, namely, S. J. Hamrock, Yandrastis, Michael A., *Polymer Reviews*, 46, 219 (2006).

STATEMENT AS TO RIGHTS UNDER FEDERALLY-SPONSORED RESEARCH

This invention was made with government support under Grant No. DE-FG36-06GO16030 awarded by U.S. Department of Energy (DOE), Grant No. W911NF-11-1-0454 awarded by the U.S. Army, and Grant No. CBET-1032948 awarded by the National Science Foundation. The government has certain rights in the invention.

FIELD OF THE INVENTION

The present invention relates generally to nanotechnologies, and more particularly to nanocomposite membranes, methods of making the same, and applications of the same.

BACKGROUND OF THE INVENTION

Fossil fuels are currently the predominant source of energy in the world. Due to concerns such as carbon dioxide emissions and the finite nature of the supply of fossil fuel, research and development and commercialization of alternative sources of energy have grown significantly over the preceding decades. One focus of research and development is hydrogen fuel cells, which can quietly and efficiently generate electrical power while producing only heat and water as significant byproducts.

One type of hydrogen fuel cells is a proton exchange membrane (PEM) fuel cell. A PEM is a membrane generally made from an ionomer and designed to conduct protons while being impermeable to gases such as oxygen or hydrogen. PEM fuel cells have potential to replace internal combustion engines, the current dominant source of energy for motor vehicles and other such mobile propulsion applications. At the anode electrode of a PEM fuel cell, hydrogen molecules are oxidized to hydrogen ions, i.e., protons, and electrons. The protons permeate across a polymer membrane that acts as an electrolyte (the PEM) while the electrons flow through an external circuit, ending up at the cathode where they combine with protons and oxygen to form water. Some of the energy of the electrons is captured as they flow through the external circuit, thus generating electric power. At the cathode of a hydrogen/air fuel cell, oxygen reacts with electrons and protons that migrate across the PEM to produce water. Thus, in the past decade, research and development have focused on the membrane composition and structure of the PEM and methods of forming the PEM, where the PEM structure is robust and the manufacturing process thereof is simplified.

Alkaline anion-exchange membrane fuel cells (AAEM-FCs) are a potentially significant technology that could compete with the more popular and well-studied PEM fuel cells for a variety of applications. The alkaline anion exchange membrane (AEM or AAEM) is a membrane generally made from ionomers with positively charged fixed ion-exchange sites and designed to conduct anions while being impermeable to gases such as oxygen or hydrogen. During alkaline fuel cell operation, the membrane conducts hydroxide ions. A fundamental drawback of all AEMs is the fact that hydroxide anions have a lower inherent mobility than protons which adversely affects ionic conduction in an AEM. To compensate for these two problems, membrane researchers have focused their attention on the use of high ion-exchange capacity polymers, but this strategy exacerbates the problems of membrane brittleness in the dry state and poor mechanical strength when the membrane is fully hydrated.

Therefore, a heretofore unaddressed need exists in the art to address the aforementioned deficiencies and inadequacies.

SUMMARY OF THE INVENTION

In one aspect, the present invention relates to a method of fabricating a composite membrane. In one embodiment, the method includes: forming a first solution comprising a charged polymer and a first uncharged polymer having a repeat unit of a formula of:

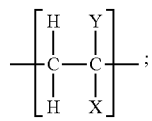

forming a second solution comprising a second uncharged polymer; electrospinning, separately and simultaneously, the first solution and the second solution to form a dual fiber mat, where the dual fiber mat comprises first polymer fibers formed from the first solution and second polymer fibers formed from the second solution; and processing the dual fiber mat to form the composite membrane. In one embodiment, each of X and Y is a non-hydroxyl group.

In one embodiment, the charged polymer is selected from perfluorosulfonic acid (PFSA) polymer and perfluoro imide acid (PFIA) polymer. In one embodiment, the charged polymer is selected from Nafion ® and Aquivion®. In one embodiment, each of X and Y is fluoride, and the first uncharged polymer is polyvinylidene difluoride (PVDF) or a copolymer of PVDF. In one embodiment, X is hydrogen group, Y is a carboxylic acid group, and the first uncharged polymer is poly(acrylic acid) (PAA). In one embodiment, the second uncharged polymer is polyvinylidene difluoride (PVDF) or polyphenylsulfone (PPSU).

In one embodiment, the step of processing the dual fiber mat to form the composite membrane includes: compressing the dual fiber mat; and exposing the dual fiber mat to solvent vapor to soften and flow at least one of the first polymer fibers and the second polymer fibers to fill void space on the dual fiber mat. In one embodiment, the step of exposing the dual fiber mat to solvent vapor to soften and flow at least one of the first polymer fibers and the second polymer fibers further includes thermal annealing the dual fiber mat.

In one embodiment, the step of processing the dual fiber mat to form the composite membrane includes: compressing the dual fiber mat; and heating to anneal the dual fiber mat, and flowing at least one of the first polymer fibers and the second polymer fibers to fill void space on the dual fiber mat.

In one embodiment, the step of processing the dual fiber mat to form the composite membrane comprises crosslinking the charged polymer and the first uncharged polymer in the first polymer fibers of the dual fiber mat. In one embodiment, another components may be added to the first solution to crosslink at least one of the charged polymers and the first uncharged polymers during or after electrospinning. In one embodiment, the step of processing the dual fiber mat to form the composite membrane includes crosslinking the second uncharged polymer in the second polymer fibers of the dual fiber mat.

In one embodiment, the composite membrane is a proton exchange membrane (PEM), or an anion exchange membrane (AEM).

In another aspect, the present invention provides a composite membrane fabricated by the method described above. In one embodiment, the composite membrane includes a fiber network of a first polymer fibers surrounded by a matrix formed from second polymer fibers or a fiber network of the second polymer fibers surrounded by a matrix formed from the first polymer fibers. The first polymer fibers are formed from a first solution, and the first solution includes a charged polymer and a first uncharged polymer having a repeat unit of a formula of:

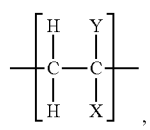

where each of X and Y is a non-hydroxyl group. The second polymer fibers are formed from a second solution, and the second solution includes a second uncharged polymer.

In one embodiment, the polymer matrix is formed by: softening and flowing the first polymer fibers of a dual fiber mat formed by the first polymer fibers and the second polymer fibers, to fill void space between the second polymer fibers in the dual fiber mat; or softening and flowing the second polymer fibers of the dual fiber mat formed by the first polymer fibers and the second polymer fibers, to fill void space between the first polymer fibers in the dual fiber mat.

In one embodiment, the step of processing the dual fiber mat to form the composite membrane includes: compressing the dual fiber mat; and exposing the dual fiber mat to solvent vapor to soften and flow at least one of the first polymer fibers and the second polymer fibers to fill void space on the dual fiber mat. In one embodiment, the step of exposing the dual fiber mat to solvent vapor to soften and flow at least one of the first polymer fibers and the second polymer fibers further includes thermal annealing the dual fiber mat. In one embodiment, the step of processing the dual fiber mat to form the composite membrane includes: compressing the dual fiber mat; and heating to anneal the dual fiber mat, and flowing at least one of the first polymer fibers and the second polymer fibers to fill void space on the dual fiber mat.

In one embodiment, the step of processing the dual fiber mat to form the composite membrane comprises crosslinking the charged polymer and the first uncharged polymer in the first polymer fibers of the dual fiber mat. In one embodiment, another components may be added to the first solution to crosslink at least one of the charged polymers and the first uncharged polymers during or after electrospinning. In one embodiment, the step of processing the dual fiber mat to form the composite membrane includes crosslinking the second uncharged polymer in the second polymer fibers of the dual fiber mat.

In one embodiment, the composite membrane is a proton exchange membrane (PEM), or an anion exchange membrane (AEM).

In one embodiment, the charged polymer is selected from perfluorosulfonic acid (PFSA) polymer and perfluoro imide acid (PFIA) polymer. In one embodiment, the charged polymer is selected from Nafion® and Aquivion®. In one embodiment, each of X and Y is fluoride, and the first uncharged polymer is polyvinylidene difluoride (PVDF) or a copolymer of PVDF. In one embodiment, X is hydrogen group, Y is a carboxylic acid group, and the first uncharged polymer is poly(acrylic acid) (PAA). In one embodiment, the second uncharged polymer is polyvinylidene difluoride (PVDF) or polyphenylsulfone (PPSU)

In one embodiment, the present invention provides a fuel cell having at least one composite membrane as described above.

In a further aspect, the present invention relates to a method of fabricating a composite membrane. In one embodiment, the method includes: forming a first solution comprising a charged polymer and a first uncharged polymer having a repeat unit of a formula of:

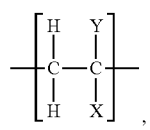

where each of X and Y is a non-hydroxyl group; forming a second solution comprising a second uncharged polymer; co-axial electrospinning to form a core-shell fiber mat having core-shell fibers, where each of the core-shell fiber has a core and a shell, the shell is formed from the first solution, and the core is formed form the second solution; and processing the core-shell fiber mat to form the composite membrane.

In one embodiment, the charged polymer is selected from perfluorosulfonic acid (PFSA) polymer and perfluoro imide acid (PFIA) polymer. In one embodiment, the charged polymer is selected from Nafion® and Aquivion®. In one embodiment, each of X and Y is fluoride, and the first uncharged polymer is polyvinylidene difluoride (PVDF) or a copolymer of PVDF. In one embodiment, X is hydrogen group, Y is a carboxylic acid group, and the first uncharged polymer is poly(acrylic acid) (PAA). In one embodiment, the second uncharged polymer is polyvinylidene difluoride (PVDF) or polyphenylsulfone (PPSU).

In one embodiment, the step of processing the core-shell fiber mat to form the composite membrane includes: compressing the core-shell fiber mat; and exposing the core-shell fiber mat to solvent vapor to soften and flow at least one of the cores and the shells of the core-shell fibers to fill void space on the core-shell fiber mat.

In one embodiment, the step of processing the core-shell fiber mat to form the composite membrane includes: compressing the dual fiber mat; and heating to anneal the core-shell fiber mat, and flowing at least one of the cores and the shells of the core-shell fibers to fill void space on the dual fiber mat.

In yet another aspect, the present invention relates to a method of fabricating a composite membrane. In one embodiment, the method includes: forming a solution comprising a charged polymer and an uncharged polymer, the uncharged polymer comprising a repeat unit having a formula of:

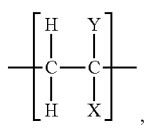

where each of X and Y is a non-hydroxyl group; electrospinning the solution to form a fiber mat; and processing the fiber mat to form the composite membrane. In certain embodiments, the step of processing is performed by heating and compacting the fiber mat to form the composite membrane.

In one embodiment, the charged polymer is selected from perfluorosulfonic acid (PFSA) polymer and perfluoro imide acid (PFIA) polymer. In one embodiment, the charged polymer is selected from Nafion® and Aquivion®. In one embodiment, each of X and Y is fluoride, and the uncharged polymer is polyvinylidene difluoride (PVDF) or a copolymer of PVDF. In one embodiment, X is hydrogen group, Y is a carboxylic acid group, and the first uncharged polymer is poly(acrylic acid) (PAA).

In another aspect, the present invention relates to a method of fabricating a fiber mat. In one embodiment, the method include: forming a solution comprising a charged polymer and an uncharged polymer, the uncharged polymer comprising a repeat unit having a formula of

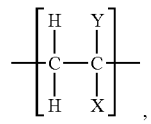

where each of X and Y is a non-hydroxyl group; and electrospinning the solution to form the fiber mat.

In one embodiment, the charged polymer is selected from perfluorosulfonic acid (PFSA) polymer and perfluoro imide acid (PFIA) polymer.

In one embodiment, the charged polymer is selected from Nafion® and Aquivion®.

In one embodiment, each of X and Y is fluoride, and the uncharged polymer is polyvinylidene difluoride (PVDF) or a copolymer of PVDF.

In another aspect, the present invention relates to a membrane-electrode-assembly (MEA) for an electrochemical device. The MEA includes at least one composite membrane that is fabricated by the method as described above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 10A shows Gravimetric water uptake and FIG. 10B shows water molecules per sulfonic acid group.

DETAILED DESCRIPTION OF THE INVENTION

Figure 1:
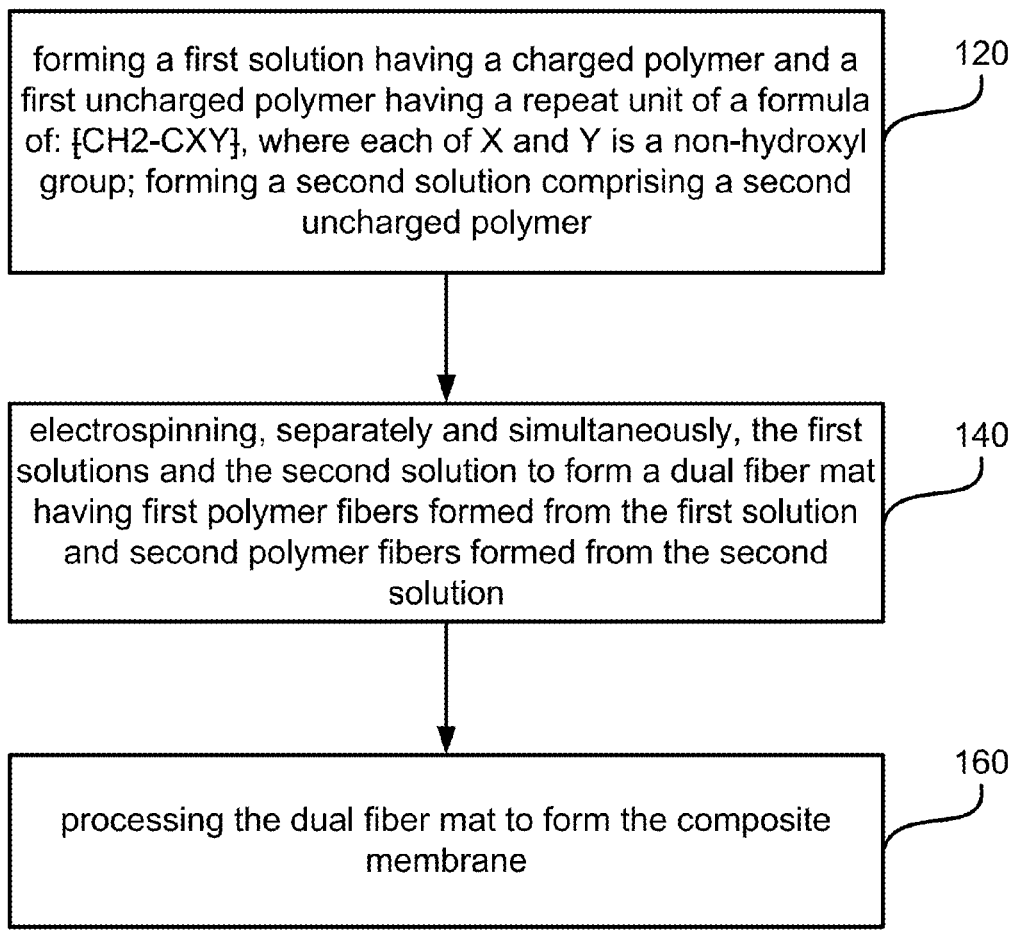
FIG. 1 shows a flowchart of forming a composite membrane according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

The terms "proton exchange membrane" or its abbreviation "PEM", as used herein, refer to a composite membrane generally made from ionomers and designed to conduct protons. The terms "proton exchange membrane fuel cell" or "PEM fuel cell", or its abbreviation "PEMFC", refer to a fuel cell using the PEM.

The terms "anion exchange membrane" or its abbreviation "AEM", as used herein, refer to a composite membrane generally made from ionomers and designed to conduct anions. The terms "anion exchange membrane fuel cell" or "AEM fuel cell", or its abbreviation "AEMFC", refer to a fuel cell using the AEM.

As used herein, the term "melt" refers to a transitional process of a substance from a solid state to a fluid-like state, such as liquid or gel. Specifically, the melting process in this disclosure refers to softening and flowing of the substance, and may be induced by pressure, temperature, other chemically inducing substances such as a solvent, or a combination thereof. Thus, melting of the substance, as used herein, is not limited to the physical phase transition of the substance from the solid state to the liquid state, and does not necessarily require elevated temperature or pressure.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear an ionizable group or bear a small number of ionizable groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

As used herein, if any, the term "quaternization" refers to a chemical process for creating quaternary ammonium fixed charge sites on a polymer chain by reaction, for example of chloromethyl groups with trimethylamine.

The term "ion exchange capacity" or its abbreviation "IEC" refers to the capacity of ion exchange, which is an exchange of ions between two electrolytes or between an electrolyte solution and a complex.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, "nanoscopic-scale", "nanoscopic", "nanometer-scale", "nanoscale", "nanocomposites", "nanoparticles", the "nano-" prefix, and the like generally refers to elements or articles having widths or diameters of less than about 1 µm, preferably less than about 300 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 0.1 and 1000 nm. A list of nanostructures includes, but not limited to, nanoparticle, nanocomposite, quantum dot, nanofilm, nanoshell, nanofiber, nanoring, nanorod, nanowire, nanotube, nanocapillary structures, and so on.

Overview of the Invention

The present invention relates to composite membranes, such as nanofiber-based membranes, PEMs or AEMs, formed by a mat of dual or multi nanofibers, methods of making the same, and corresponding applications, where one or more uncharged (or minimally charged) polymer nanofibers and one or more ion conducting polymer nanofibers forms the network of the composite membranes, where one or more of the fibers are softened and flown to surround the other fiber or fibers.

In one aspect, the present invention relates to a method of fabricating a composite membrane, such as a nanofiber-based membrane cation-exchange membrane acting as a PEM or a nanofiber-based anion-exchange membrane acting as an AEM. In one embodiment, the method includes: forming at least one first solution comprising a charged polymer and a first uncharged polymer having a repeat unit of a formula of:

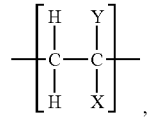

where each of X and Y is a non-hydroxyl group; forming at least one second solution comprising a second uncharged polymer; electrospinning, separately and simultaneously, the first solution and the second solution to form a fiber mat comprising first polymer fibers formed from the first solution and second polymer fibers formed from the second solution; and processing the fiber mat to form the composite membrane.

In certain embodiments, the at least one first solution is prepared by dissolving the charged polymer and the first uncharged polymer in a first solvent, the at least one second solution is prepared by dissolving the second uncharged polymer in a second solvent.

When there are only one first solution and only one second solution, the fiber mat formed is a dual fiber mat. When there are two or more first solutions and/or two or more second solutions, the fiber mat formed is a multi-fiber mat. Among the two or more first solutions, at least one of the first solutions includes the charged polymer and the first uncharged polymer. The others of the two or more first solutions may include a charged polymer and an uncharged polymer, or only include a charged polymer. The charged polymer and the uncharged polymer in the others of the two or more first solutions may be the same or different from the charged polymer and the first uncharged polymer in the at least one first solution of the two or more first solutions. Among the two or more second solutions, at least one of the second solutions includes the second uncharged polymer. The others of the two or more second solutions may include an uncharged polymer that is the same or different from the second uncharged polymer in the at least one second solution.

In certain embodiments, the charged polymer in the at least one first solution is selected from perfluorosulfonic acid (PFSA) polymer and perfluoro imide acid (PFIA) polymer. For example, the charged polymer may be selected from Nafion®, Aquivion®, and a combination thereof. In certain embodiment, each of X and Y is fluoride, and the first uncharged polymer is polyvinylidene difluoride (PVDF) or a copolymer of PVDF. In certain embodiment, X is hydrogen group, Y is a carboxylic acid group, and the first uncharged polymer is poly(acrylic acid) (PAA). In one embodiment, the second uncharged polymer is PVDF or polyphenylsulfone (PPSU). In one embodiment, the first uncharged polymer may also be PPSU, which does not have the formula as described above.

In certain embodiment, the first polymer fibers are formed by electrospinning the first solution from the first needle, and the second polymer fibers are formed by electrospinning the second solution from the second needle, and the dual fiber mat is formed by co-electrospinning via the first needle and the second needle. The co-electrospinning process may involve applying a high voltage electric field to each needle containing the corresponding polymer solution. Mutual charge repulsion on the surface of the solution overcomes the surface tension such as to produce and eject a thin liquid jet of the solution from the tip of the needle. As the jet of electrified solution travels towards a collector with a different electric potential, electrostatic repulsion from surface charges causes the diameter of the jet to narrow. The jet may enter a whipping mode and thereby be stretched and further narrowed due to instabilities in the electric field. Solid fibers are produced as the jet dries and the fibers accumulate on the collector to form a non-woven material. The voltage applied to the first needle and the second needle may be the same or different. When there are two or more first solutions and/or two more second solutions available, multiple needles corresponding to the types of first/second solutions are used, and the fiber mat formed is a multi-fiber mat instead of a dual fiber mat.

The fiber mat formed is then processed to form the composite membrane. In certain embodiments, when the fiber mat is a dual fiber mat, the step of processing the dual fiber mat to form the composite membrane includes: compressing the dual fiber mat; and softening and flowing the first polymer fibers to fill void space between the second polymer fibers, or softening and flowing the second polymer fibers to fill void space between the first polymer fibers, to form the composite membrane. In certain embodiments, the compressing may increase density of the first polymer fibers or the second polymer fibers in the fiber mat. According to one embodiment, in the formed composite membrane, the softened and flown first polymer fiber forms a matrix to surround the second polymer fibers. According to another embodiment, in the formed composite membrane, the softened and flown second polymer fiber forms a matrix to surround the first polymer fibers.

In certain embodiment, the step of processing the dual fiber mat to form the composite membrane includes compressing the dual fiber mat, and treating the dual fiber mat in such a way as to soften and flow the first polymer fibers or the second polymer fibers to fill the void space between the second polymer fibers or the first polymer fibers.

In certain embodiment, the step of processing the dual fiber mat to form the composite membrane includes compressing the dual fiber mat, and exposing the dual fiber mat to solvent vapor to soften and flow the first polymer fibers or the second polymer fibers to fill the void space between the second polymer fibers or the first polymer fibers. In one embodiment, the step further includes, after compressing and exposing the fiber mat to solvent vapor to soften and flow, thermal annealing the.

In certain embodiments, the method may further include increasing density of the polyelectrolyte fibers in the dual fiber mat prior to solvent vapor exposure and/or thermal annealing.

In one embodiment, the step of processing the dual fiber mat to form the composite membrane includes crosslinking the charged polymer and the first uncharged polymer in the first polymer fibers. In one embodiment, the step of processing the dual fiber mat to form the composite membrane includes crosslinking the second uncharged polymer in the second polymer fibers. In one embodiment, the at least one first solution includes more than one charged polymers or precursors, and the more than one charged polymers or precursors and the first uncharged polymer are cross-linked. In one embodiment, only the first polymer fibers are interconnected. In one embodiment, the first polymer fibers are interconnected via the charged polymer.

The above process of forming the composite membrane from the fiber mat is exemplified by forming the composite membrane from the dual fiber mat, but the present invention is not limited thereof. In certain embodiments, the fiber mat may be multi-fiber mat instead of dual fiber mat, which includes three or more type of polymer fibers. The process then includes compressing the multi-fiber mat, and softening and flowing at least one of the three or more polymer fibers to fill void space between the others of the three or more polymer fibers, to form the composite membrane.

In certain embodiments, in addition to the charged polymer and the first uncharged polymer, the at least one first solution may further include another charged polymer. In certain embodiments, in addition to the second uncharged polymer, the at least one second solution may further include another uncharged polymer.

In one embodiment, the first solution includes Nafion® and PVDF, one second solutions includes PPSU, and another second solution includes PVDF. Each of the first solution and the two second solutions are electrospun to form respective nanofibers, and a multi-fiber mat is formed from the three nanofibers. During processing of the multi-fiber mat, the PVDF is allowed to soften and flow around the Nafion®/PVDF and PPSU fibers. Thus, the mechanically weak but chemically inert PVDF polymer matrix is strengthen by the present of the high-strength PPSU nanofibers, which improves the overall mechanically properties of the membrane.

In one embodiment, the electrospinning rate of fiber deposition of the first and second solution is varied during mat fabrication. As a consequence of this variation, there is a step-change (layered) or a continues gradient in the volume fraction of polyelectrolyte in the membrane thickness direction after these mats are processed into a composite nanofiber-based cation exchange membrane (a PEM) or nanofiber-based anion-exchange membrane (an AEM).

In certain embodiments, the charged polymer in the at least one first solution is replaced with a polyelectrolyte (ionomer) precursor, where the precursors are functionalized to produce fixed-charge ion-exchange sites during the processing of the dual or multiple fiber mat into a nanofiber-based cation-exchange membrane (a PEM) or a nanofiber-based anion-exchange membrane (an AEM).

In another aspect, the present invention provides a composite membrane fabricated by the method described above. The composite membrane includes a polymer fiber network and a polymer matrix encompassing the polymer fiber network. The fiber network may be formed from the dual or multi-fiber mat, and the matrix is formed by softening and flowing at least one of the first and second polymer fibers to fill in the void space between the other one of the first and second polymer fibers in the fiber mat. In one embodiment, the composite membrane includes a network of the second polymer fibers formed from the second uncharged polymer, and a matrix of the first polymer fibers formed from the charged polymer the first uncharged polymer. In certain embodiments, the composite membrane includes nanofibers, and the composite membrane may be a nanofiber-based cation-exchange membrane (a PEM) or a nanofiber-based anion-exchange membrane (an AEM). In certain embodiments, the composite membrane has a multilayer structure, and relative amounts of the at least one first polymer fibers and the softened and flown matrix of the at least one second polymer fibers, or relative amounts of the at least one second polymer fibers and the softened and flown matrix of the at least one first polymer fibers vary in thickness direction that is perpendicular to the membrane surface of the composite membrane. In one embodiment, the relative amounts vary in a step function or a continuous gradient function in the thickness direction or the composite membrane.

In certain embodiments, the at least one first polymer fibers include polyelectrolyte fibers, and the at least one second polymer fibers include uncharged or minimally charged polymer fibers.

In certain embodiments, the composite membrane includes a network of polyelectrolyte fibers and a polymer matrix encompassing the network. The network is formed from a dual fiber mat of second polymer fibers formed from the second uncharged (or minimally charged) polymer and the first polymer fibers formed from the polyelectrolyte/first uncharged polymer fibers. The polymer matrix is formed by softening and flowing the second polymer fibers of the dual fiber mat to fill void space between the first polymer fibers.

In one embodiment, the first polymer fibers are welded to create an interconnected 3-dimensional fiber network prior to softening and flowing the second polymer around the polyelectrolyte fibers.

In certain embodiments, the composite membrane is a proton exchange membrane (PEM), or an anion exchange membrane (AEM).

In one aspect, the present invention provides a fuel cell having at least one composite membrane fabricated by one of the methods described above. In one aspect, the present invention relates to a fuel cell having at least one composite membrane as described above.

In certain embodiments, the composite membrane of the present invention as disclosed above is robust. In one embodiment of the invention, the ion conducting polymer and the uncharged (or minimally charged) polymer are simultaneously electrospun to form the dual fiber mat. The resulting dual fiber mat may be then processed in one of the two ways: (i) the ion conducting polymer nanofibers are allowed to "melt" without affecting the uncharged (or minimally charged) polymer nanofibers, thus filling the void space between the uncharged (or minimally charged) polymer fibers to form a membrane where the uncharged (or minimally charged) polymer nanofibers are surrounded by the ion conducting polymer; or (ii) the uncharged (or minimally charged) polymer nanofibers are allowed to "melt" without affecting the charged (ion conducting) polymer nanofibers, thus filling the void volume between the ion conducting nanofibers to form a membrane where the ion conducting nanofibers are surrounded by the uncharged (or minimally charged) polymer. Hereinafter, the term "melt" refers to the softening and flowing of the polymer, where the nanofibers are subject to exposure to a selective solvent at near ambient temperature conditions, and does not necessarily require an elevated temperature. The absence of an impregnation step significantly simplifies the membrane fabrication process. Also, the present invention allows for the creation of gradients in the volume fraction of one or more nanofiber polymer components in the membrane thickness direction, including the creating of layered nanofiber structure of different relative composition in the final nanofiber composite final membrane.

In another aspect, the present invention relates to a method of fabricating a composite membrane. The method is similar to the method described above, and the difference lies in that the at least one first solution and the at least one second solution are co-axial electrospun to form core-shell fibers.

Specifically, in certain embodiment, the method includes: forming a first solution including a charged polymer and a first uncharged polymer having a repeat unit of a formula of:

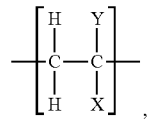

where each of X and Y is a non-hydroxyl group; forming a second solution comprising a second uncharged polymer; co-axial electrospinning to form a core-shell fiber mat, wherein each core-shell fiber of the core-shell fiber mat has a core and a shell, wherein the shell is formed from the first solution and the core is formed form the second solution; and processing the core-shell fiber mat to form the composite membrane.

In a further aspect, the present invention relates to a method of fabricating a composite membrane. The difference between this method and the methods described above lies in that, this method uses singly electrospun instead of co-electrospun. Specifically, in certain embodiments, the method includes: forming a solution comprising a charged polymer and an uncharged polymer, the uncharged polymer comprising a repeat unit having a formula of:

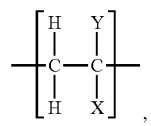

where each of X and Y is a non-hydroxyl group; electrospinning the solution to form a fiber mat; and heating and compacting the fiber mat to form the composite membrane.

In a further aspect, the present invention relates to a fuel cell membrane-electrode-assembly (MEA). In one embodiment, the fuel cell MEA has an anode electrode, a cathode electrode, and a membrane disposed between the anode electrode and the cathode electrode, where at least one of the anode electrode, the cathode electrode and the membrane is formed of nanofibers by electrospinning. In one embodiment, the membrane used in the MEA is the composite membrane as described above.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

FIG. 1 shows a flowchart of forming a composite membrane according to one embodiment of the present invention. In certain embodiments, the composite membrane may be a nanofiber-based membrane, such as a PEM or an AEM. As shown in FIG. 1, at step 120, a first solution and a second solution are prepared. The first solution includes a charged polymer and a first uncharged polymer. The first uncharged polymer has a repeat unit of a formula of:

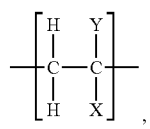

where each of X and Y is a non-hydroxyl group. The second solution includes a second uncharged polymer. In one embodiment, the charged polymer is selected from perfluorosulfonic acid (PFSA) polymer and perfluoro imide acid (PFIA) polymer. In one embodiment, PFSA is selected from Nafion® and Aquivion®. In one embodiment, each of X and Y is fluoride, and the first uncharged polymer is PVDF or a copolymer of PVDF. In one embodiment, X is hydrogen group, Y is a carboxylic acid group, and the first uncharged polymer is poly(acrylic acid) (PAA). In one embodiment, the second uncharged polymer is PVDF or polyphenylsulfone (PPSU).

At step 140, the first solution and the second solution are co-electrospun, separately and simultaneously, to form first polymer fibers from the first solution and second polymer fibers from the second solution, and a dual fiber mat is formed from the first polymer fibers and the second polymer fibers.

At step 160, the dual fiber mat was processed to form the composite membrane. The step 160 maybe performed by heating, compaction, and/or solvent vapor exposure. In one embodiment, the step 160 includes compressing the dual fiber mat, and exposing the dual fiber mat to solvent vapor to soften and flow at least one of the first polymer fibers and the second polymer fibers to fill void space on the dual fiber mat. The soften and flow may include thermal annealing the dual fiber mat. In one embodiment, the step 160 includes compressing the dual fiber mat, heating to anneal the dual fiber mat, and flowing at least one of the first polymer fibers and the second polymer fibers to fill void space on the dual fiber mat. In one embodiment, the step of processing the dual fiber mat to form the composite membrane comprises crosslinking the charged polymer and the first uncharged polymer in the first polymer fibers. In one embodiment, the step of processing the dual fiber mat to form the composite membrane comprises crosslinking the second uncharged polymer in the second polymer fibers of the dual fiber mat. In one embodiment, the composite membrane is a proton exchange membrane (PEM), or an anion exchange membrane (AEM). In one embodiment, the present invention further provides a composite membrane fabricated by the method described above. In one embodiment, the present invention further provides a fuel cell having at least one composite membrane fabricated as described above.

Figure 2:
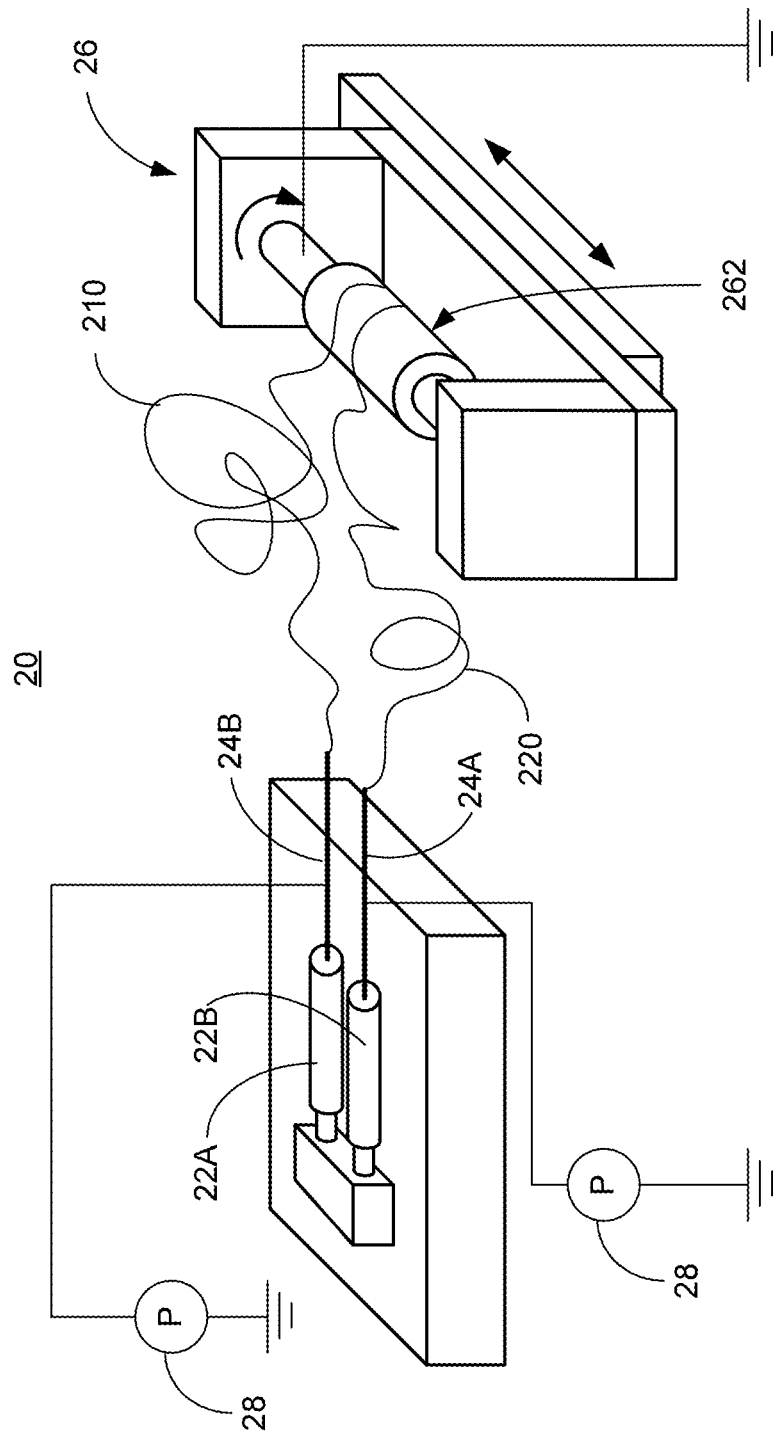
FIG. 2 shows schematically an apparatus for electrospinning, separately and simultaneously, the polymer solutions according to one embodiment of the present invention.

FIG. 2 shows schematically an apparatus for electrospinning, separately and simultaneously, the polymer solutions according to one embodiment of the present invention. The apparatus 20 includes two syringes 22A and 22B, and a target 26. The syringe 22A has a needle 24A, and the syringe 22B has a needle 24B. Further, a power supply 28 is connected to the needles 24A and 24B, respectively, and the target 26 is grounded. When electrospinning is performed, the first polymer solution and the second polymer solution are respectively provided to the syringes 22A and 22B. For each needle 24A and 24B, an electrical potential is applied for drawing out the polymer solution in the corresponding syringes 22A and 22B. Specifically, for each needle 24A and 24B, the electrical potential can be increased until the electrostatic forces in the polymer solution overcome the surface tension of the polymer solution at the tip of the needles 24A and 24B. As this surface tension is overcome, the polymer solutions can be respectively drawn out of the needles 24A and 24B toward the target 26. It should be appreciated that the flow rates for each polymer solution and the electrical potentials applied to each of the two needles 24A and 24B may be controlled separately and differently such that the electrospinning for both the first and second polymer solutions may be performed simultaneously. As the drawn out polymer solutions travel through the air, at least a portion of the solvent evaporates, resulting in the first polymer fiber 210 and the second polymer fiber 220. The first polymer fiber 210 and the second polymer fiber 220 may be then collected by the rotating cylinder 262 of the target 26. Thus, the first polymer fiber 210 and the second polymer fiber 220 may be obtained and organized to form the dual fiber mat for further processing.

Figure 3:
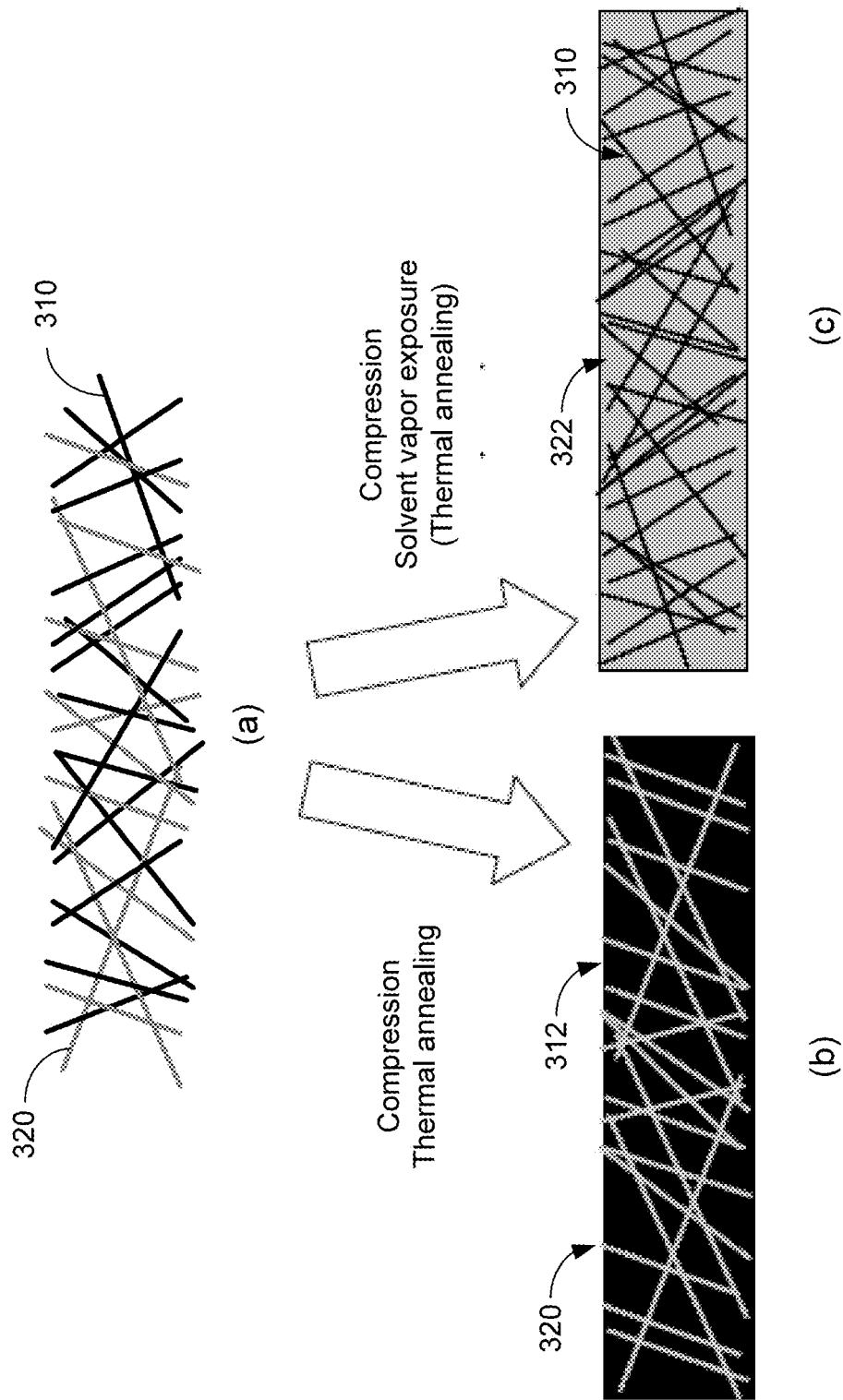
FIG. 3 shows schematically (a) a dual fiber mat for softening and flowing one of the nanofibers to form of the composite membrane according to one embodiment of the present invention, (b) a composite membrane formed by softening and flowing the charged polymer fibers to fill in the void space between the uncharged polymer fibers, and (c) a composite membrane formed by softening and flowing the uncharged polymer fibers to fill in the void space between the charged polymer fibers.

FIG. 3 shows schematically the process to the dual fiber mat for softening and flowing one of the nanofibers to form of the composite membrane according to one embodiment of the present invention. As shown in figure (a), the nanofibers of the dual fiber mat include polyelectrolyte fibers (charged polymer fibers) 310, which are shown as the black polymer fibers, and uncharged (or minimally charged) polymer fibers (uncharged polymer fibers) 320, which are shown as the gray polymer fibers. The polyelectrolyte fibers 310 and the uncharged (or minimally charged) polymer fibers 320 have been organized to form a three-dimensional dual fiber mat. It should be appreciated that the black and gray colors of the polymer fibers 310 and 320 are merely provided for distinguishing purposes of different polymer fibers, and are not intended to limit the actual colors of the polymer fibers 310 and 320.

As described above, the composite membrane, such as a nanofiber-based membrane, a PEM or an AEM, may be formed by processing the dual fiber mat by softening and flowing one of the first polymer fibers and the second polymer fibers to fill in the void space between the other of the first polymer fibers and the second polymer fibers so as to form the composite membrane. Thus, different processes may be performed to the dual fiber mat for softening and flowing one of the polymer fibers to fill in the void space between the other polymer fibers.

In one embodiment, for example, the dual fiber mat may go through compressing and thermal annealing processes such that a composite membrane structure as shown in figure (b) is formed, where the polyelectrolyte fibers 310 are softened and flown to form a polymer matrix 312 that fills in the void space between the uncharged (or minimally charged) polymer fibers 320. In other words, the composite membrane structure as shown in figure (b) includes a network of the uncharged (or minimally charged) polymer fibers 320, and a polymer matrix 312 formed by softening and flowing the charged polymer (polyelectrolyte) to fill in the void space between the uncharged (or minimally charged) polymer fibers 320.

In an alternative embodiment, the dual fiber mat may go through compressing, solvent vapor exposure and/or thermal annealing processes such that a composite membrane structure as shown in figure (c) is formed, where the uncharged (or minimally charged) polymer fibers 320 are softened and flown to form a polymer matrix 322 that fills in the void space between the polyelectrolyte fibers 310. In some embodiments, the solvent vapor may be chloroform solvent vapor. In other words, the composite membrane structure as shown in figure (c) includes a network of the polyelectrolyte fibers 310, and a polymer matrix 322 formed by softening and flowing the uncharged polymer (uncharged (or minimally charged) polymer) to fill in the void space between the polyelectrolyte fibers 310.

The method of forming the composite membrane as shown in FIG. 3 is inherently simpler and more robust than an impregnation scheme, and the final polymer morphology is not limited by dispersion/compatibility problems that often plague blended membrane systems. As will be shown below, the resulting membranes have attractive properties for fuel cell and other applications.

It should be appreciated that, for any of the composite membrane structure as shown in figures (b) and (c) of FIG. 3, polymer welds or interconnections between intersecting fibers of the dual fiber mat, although not explicitly shown, may be formed for increasing strength of the composite membrane and for interconnectivity of ionically conductive fibers. Further, for any of the composite membrane structure as shown in figures (b) and (c) of FIG. 3, additional processes may be provided for increasing density of the first polymer fibers in the dual fiber mat, or for interconnecting the first polymer fibers. For example, for the composite membrane structure in figure (b), additional processes may be provided for increasing density of the uncharged (or minimally charged) polymer fibers 320 in the dual fiber mat, or for interconnecting the uncharged (or minimally charged) polymer fibers 320. Similarly, for the composite membrane structure in figure (c), additional processes may be provided for increasing density of the polyelectrolyte fibers 310 in the dual fiber mat, or for interconnecting the polyelectrolyte fibers 310.

It should be appreciated that, in some embodiments, the composite membrane and the methods forming the composite membrane allow for flexibility in forming a phase-separated nanomorphology. For example, the composite membrane may be customized by the independent selection of a number of variables including, but not limited to, the selection of the polyelectrolyte polymer and the uncharged (or minimally charged) polymer; the general diameter of the nanofibers; the fraction of volume occupied by the nanofibers; the total number of different types (different composition) nanofibers; and other suitable variables.

As described above, embodiments of the composite membrane and methods of forming the composite membrane may be used in a variety of applications, such as fuel cells including at least one composite membrane as described above (e.g., PEM fuel cells or AEM fuel cells). In some embodiments, other applications of the composite membrane may include electrodialysis separations, membrane sensors, electrolyses, and other such suitable applications.

Figure 4:
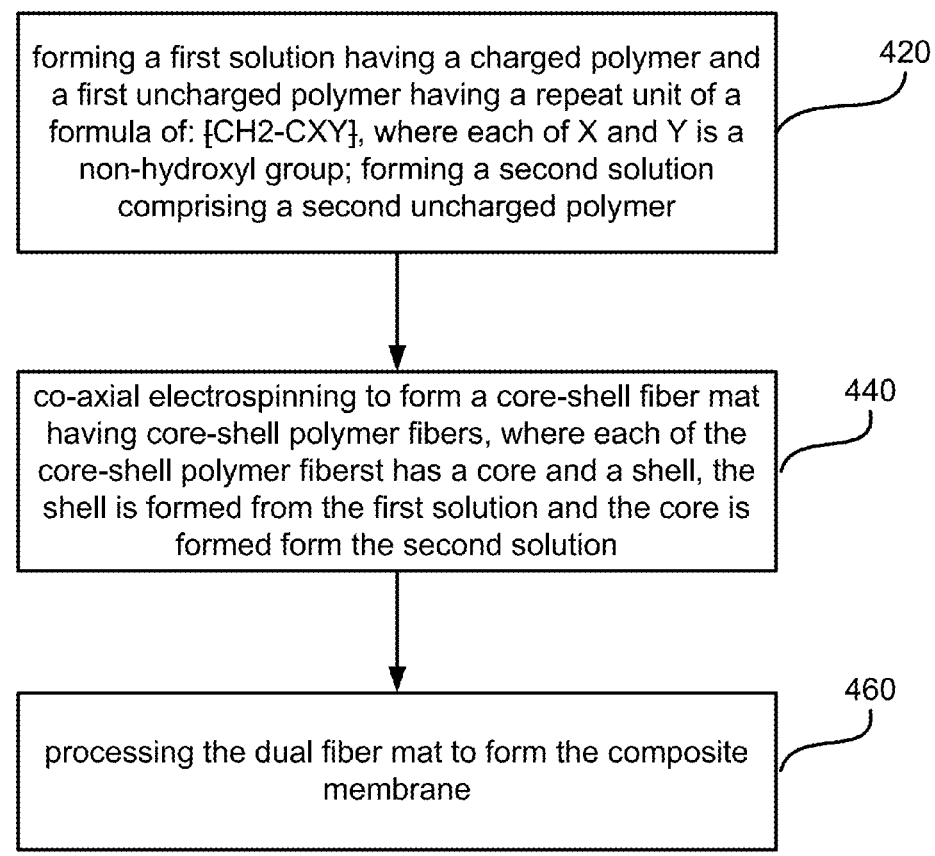
FIG. 4 shows a flowchart of forming a composite membrane according to one embodiment of the present invention.

FIG. 4 shows a flowchart of forming a composite membrane according to one embodiment of the present invention. As shown in FIG. 4, at step 420, a first solution and a second solution are prepared. The first solution includes a charged polymer and a first uncharged polymer. The first uncharged polymer has a repeat unit of a formula of:

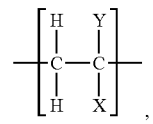

where each of X and Y is a non-hydroxyl group. The second solution includes a second uncharged polymer. In one embodiment, the charged polymer is selected from perfluorosulfonic acid (PFSA) polymer and perfluoro imide acid (PFIA) polymer. In one embodiment, PFSA is selected from Nafion® and Aquivion®. In one embodiment, each of X and Y is fluoride, and the first uncharged polymer is PVDF or a copolymer of PVDF. In one embodiment, X is hydrogen group, Y is a carboxylic acid group, and the first uncharged polymer is poly(acrylic acid) (PAA). In one embodiment, the second uncharged polymer is PVDF or polyphenylsulfone (PPSU).

At step 440, the first solution and the second solution are co-electrospun, separately and simultaneously, to form core-shell fibers from the first solution and the second solution, and a fiber mat is formed from the core-shell fibers. Each core-shell fiber of the core-shell fiber mat has a core and a shell. The shell is formed from the first solution and the core is formed form the second solution, and the shell encloses the core.

At step 460, the core-shell fiber mat was processed to form the composite membrane. The step 460 maybe performed by heating, compaction, and/or solvent vapor exposure. In one embodiment, the step 460 includes compressing the core-shell fiber mat, and exposing the core-shell fiber mat to solvent vapor to soften and flow a part of the core-shell fibers to fill void space on the core-shell fiber mat. The soften and flow may include thermal annealing the core-shell fiber mat. In one embodiment, the step 460 includes compressing the core-shell fiber mat, heating to anneal the core-shell fiber mat, and flowing part of the core-shell fibers to fill void space on the core-shell fiber mat. In certain embodiments, only the shell part or only the core part of the core-shell partially or completely melt during the heating process. In other embodiments, both the shell part and the core part are partially melted during the hearing process. In one embodiment, the step of processing the core-shell fiber mat to form the composite membrane includes crosslinking the charged polymer and the first uncharged polymer in the core-shell fibers. In one embodiment, the composite membrane is a proton exchange membrane (PEM), or an anion exchange membrane (AEM). In one embodiment, the present invention further provides a composite membrane fabricated by the method described above. In one embodiment, the present invention further provides a fuel cell having at least one composite membrane fabricated as described above.

Figure 5:
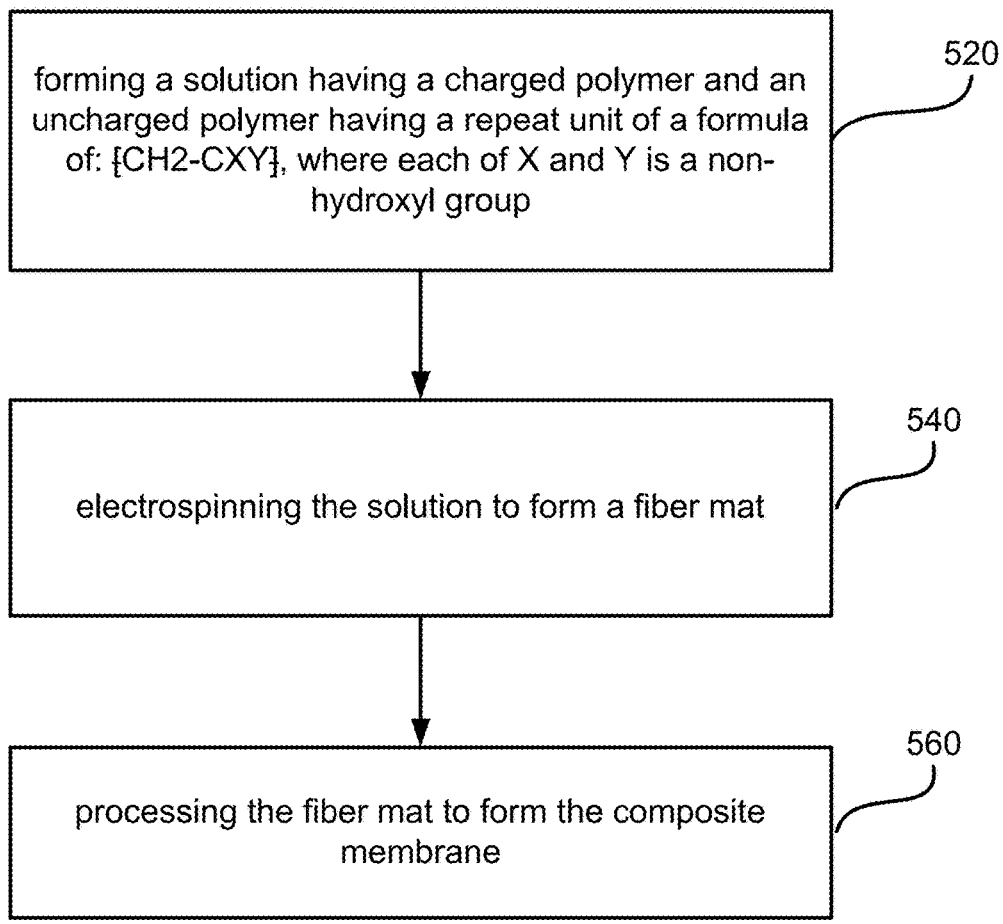
FIG. 5 shows a flowchart of forming a composite membrane according to one embodiment of the present invention.

FIG. 5 shows a flowchart of forming a composite membrane according to one embodiment of the present invention.

As shown in FIG. 5, at step 520, a solution is prepared. The solution includes a charged polymer and an uncharged polymer. The uncharged polymer has a repeat unit of a formula of:

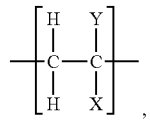

where each of X and Y is a non-hydroxyl group. In one embodiment, the charged polymer is selected from perfluorosulfonic acid (PFSA) polymer and perfluoro imide acid (PFIA) polymer. In one embodiment, PFSA is selected from Nafion ® and Aquivion®. In one embodiment, each of X and Y is fluoride, and the first uncharged polymer is PVDF or a copolymer of PVDF. In one embodiment, X is hydrogen group, Y is a carboxylic acid group, and the first uncharged polymer is poly(acrylic acid) (PAA). In one embodiment, uncharged polymer is polyphenylsulfone (PPSU).

At step 540, the solution is electrospun to form polymer fibers from the solution, and a fiber mat is formed from the polymer fibers.

At step 560, the fiber mat was processed to form the composite membrane. The step 560 maybe performed by heating, compaction, and/or solvent vapor exposure as described above in steps 160 and 460. During heating, at least one of the charged polymer or uncharged polymer is melted to flow and fill void spaces in the fiber mat. In one embodiment, the composite membrane is a proton exchange membrane (PEM), or an anion exchange membrane (AEM). In one embodiment, the present invention further provides a composite membrane fabricated by the method described above. In one embodiment, the present invention further provides a fuel cell having at least one composite membrane fabricated as described above.

Figure 6:
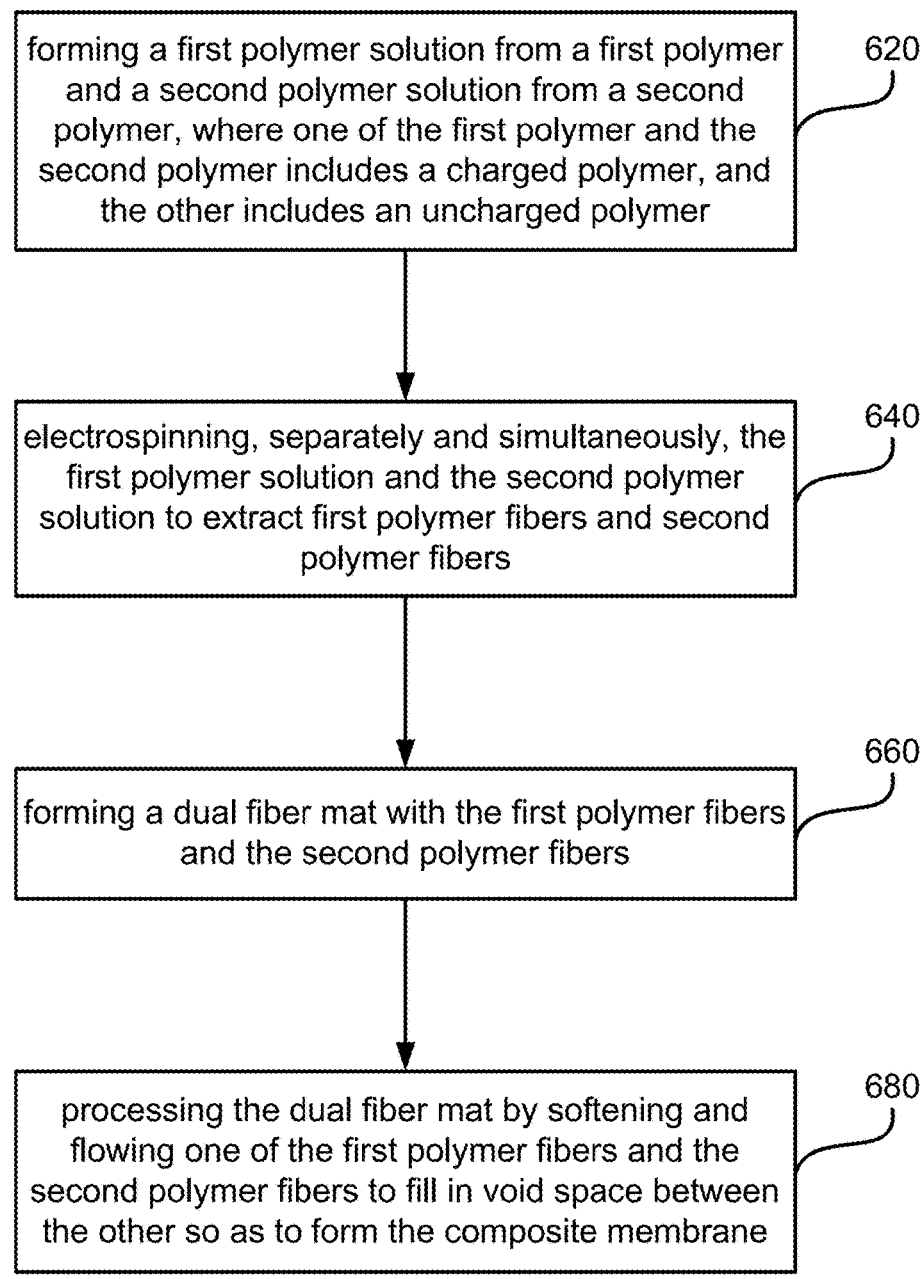
FIG. 6 shows a flowchart of forming a composite membrane according to one embodiment of the present invention.

FIG. 6 shows a flowchart of forming a composite membrane according to one embodiment of the present invention. In some embodiments, the composite membrane may be a nanofiber-based membrane, such as a PEM or an AEM. As shown in FIG. 6, the method includes: forming a first polymer solution from a first polymer and a second polymer solution from a second polymer, where one of the first polymer and the second polymer includes a charged polymer, and the other of the first polymer and the second polymer includes an uncharged polymer (step 620); electrospinning, separately and simultaneously, the first polymer solution and the second polymer solution to form first polymer fibers and second polymer fibers (step 640); forming a dual fiber mat with the first polymer fibers and the second polymer fibers (step 660); and processing the dual fiber mat by softening and flowing one of the first polymer fibers and the second polymer fibers to fill in the void space between the other of the first polymer fibers and the second polymer fibers so as to form the composite membrane (step 680).

As described above, one of the first polymer and the second polymer includes a charged polymer, and the other of the first polymer and the second polymer includes an uncharged polymer. In some embodiments, an example of uncharged polymer includes polyphenylsulfone (PPSU), chloromethylated polysulfone, and examples of charged polymers include 3M660 perfluorosulfonic acid ionomer, and Nafion®. Details of the examples of uncharged and charged polymer will be discussed later in the examples section.

In one embodiment, three or more different polymer solutions are electrospun separately and simultaneously where at least one polymer is a charged polymer and at least one polymer is an uncharged polymer.

In one embodiment, the first polymer solution and the second polymer solution may be formed by dissolving a first polymer in a first solvent to form the first polymer solution and dissolving a second polymer in a second solvent to form the second polymer solution. The first solvent and the second solvent may be the same or different depending on the type of polymers used as the first and second polymers. Details of the polymer used will be explained hereinafter with concrete examples.

Electrospinning of the polymer solutions may be performed with a variety of electrospinning apparatuses or devices known to the person of ordinary skill in the art. In one embodiment, the apparatus used for electrospinning is as shown in FIG. 2, with similar processes as described above in relation to FIG. 2.

In certain embodiments, the process 640 is similar to or the same as the process shown in FIG. 3 and described as above in relation to FIG. 3.

It should be appreciated that, for any of the composite membrane structure as shown in figures (b) and (c) of FIG. 3, polymer welds or interconnections between intersecting fibers of the dual fiber mat, although not explicitly shown, may be formed for increasing strength of the composite membrane and for interconnectivity of ionically conductive fibers. Further, for any of the composite membrane structure as shown in figures (b) and (c) of FIG. 3, additional processes may be provided for increasing density of the first polymer fibers in the dual fiber mat, or for interconnecting the first polymer fibers. For example, for the composite membrane structure in figure (b), additional processes may be provided for increasing density of the uncharged (or minimally charged) polymer fibers 320 in the dual fiber mat, or for interconnecting the uncharged (or minimally charged) polymer fibers 320. Similarly, for the composite membrane structure in figure (c), additional processes may be provided for increasing density of the polyelectrolyte fibers 310 in the dual fiber mat, or for interconnecting the polyelectrolyte fibers 310.

It should be appreciated that, in some embodiments, the composite membrane and the methods forming the composite membrane allow for flexibility in forming a phase-separated nanomorphology. For example, the composite membrane may be customized by the independent selection of a number of variables including, but not limited to, the selection of the polyelectrolyte polymer and the uncharged (or minimally charged) polymer; the general diameter of the nanofibers; the fraction of volume occupied by the nanofibers; the total number of different types (different composition) nanofibers; and other suitable variables.

As described above, embodiments of the composite membrane and methods of forming the composite membrane may be used in a variety of applications, such as fuel cells including at least one composite membrane as described above (e.g., PEM fuel cells or AEM fuel cells). In some embodiments, other applications of the composite membrane may include electrodialysis separations, membrane sensors, electrolyses, and other such suitable applications.

Example One

In this example, a composite membrane including first polymer fibers and second polymer fibers is fabricated. The first polymer fibers are made of a first solution containing about 99 wt % perfluorosulfonic acid (PFSA), and about 1 wt % poly(ethylene oxide) (PEO). The second polymer fibers are made of second solution containing 60 wt % PFSA and 40 wt % PVDF. The dual fiber electrospinning method as disclosed in the application was utilized for the fabrication of the composite membrane, where the two polymer solutions were simultaneously electrospun into a dual-fiber mat. Follow-on processing converted the dual fiber mat into a fully dense and functional fuel cell ion-exchange membrane with PFSA nanofibers embedded in an PFSA/PVDF matrix. The proton conductivity of the composite membrane when immersed in room temperature water was 0.079 S/cm. The gravimetric water swelling and in-plane (lateral) membrane swelling in water at 25° C. were 50.8% and 18.7%.

Example Two

In this example, a composite membrane includes core-shell fiber mat. Each of the core-shell fibers in the core-shell fiber mat have a shell made of a first solution containing about 80 wt % perfluorosulfonic acid or Nafion® PFSA, and about 20 wt % PVDF or copolymer of PVDF, and a core made of a second solution containing pure PVDF or a copolymer of PVDF. It is also possible to reverse the core and shell compositions, with neat PVDF in the shell and an ionomer/PVDF (PFSA/PVDF) blend in the core. The composition membrane was obtained by co-axial electron spinning of the core-shell fibers. The obtained core-shell fiber mat is converted into a fully dense and functional fuel cell ion-exchange membrane. For this specific example, a coaxial needle spinneret was used for electrospinning and core-shell fibers were collected on a rotating drum. The conditions for electrospinning are a voltage of 14.7 kV, and spinneret-to-collector distance of 7.5 cm, room temperature and 27% relative humidity, a core flow rate of 0.1 ml/hr and a shell flow rate of 0.2 ml/hr. The core-shell fiber mat was converted into a dense and defect-free membrane by hot pressing (2 minutes at 360° F. with a force of about 4500 lbs) followed by thermal annealing (30 minutes at 200° C.). The effective membrane ion exchange capacity was 0.84 meq/g. The proton conductivity, gravimetric water swelling, and lateral water swelling (in room temperature water) are listed in Table 1.

TABLE 1

Properties of the resulted composite membrane.

| | In-Plane Conductivity (S/cm) | Gravimetric Swelling (%) | Lateral Swelling (%) |
|---|---|---|---|
| Core-Shell Membrane | 0.070 | 18 | 10 |

Example Three

In this example, a composite membrane includes electrospun fibers. The electrospun fibers are formed from a solution containing about 60 or 80 wt % PFIA, with the remaining polymer being PVDF or a copolymer of PVDF (for this example, 20 wt % or 40 wt % PVDF or copolymer of PVDF). The electronspun fibers form a fiber mat, and the fiber mat is converted into a fully dense and functional fuel cell ion-exchange membrane. The electrospinning conditions are listed in Table 2. The fiber mats were converted into dense membranes by drying at 60° C. under vacuum overnight, hot-pressing at 177° C. for 2.5 minutes at 10000 lbs, and annealing for 90 minutes at 150° C. under vacuum. Membrane properties for the two composite membranes are listed in Table 3.

TABLE 2

Electrospinning conditions for forming the composite membranes.

| Parameter | 99:1 3M PFIA:PEO (1 MDa) | Solef PVDF |
|---|---|---|
| Voltage [kV] | 8 | 10 |
| Flow Rate [mL/hr] | 0.50 | 0.13-0.46 |
| Relative Humidity [%] | 0.25 | 0.25 |
| Spinner-to-Collector Distance [cm] | 8 | 10.5 |
| Concentration [%] | 20 | 12.5 |
| Solvent | 2:1 nPropanol:H$_2$O | 7:3 DMAc:Acetone |

TABLE 3

Properties of the resulted composite membranes.

| wt % PFIA | In-Plane Conductivity [S/cm] | Gravimetric Swell [%] | Lateral Swell [%] |
|---|---|---|---|
| 80 | 0.115 | 60 | 18 |
| 60 | 0.076 | 35 | 4.1 |

Example Four

In this example, a composite membrane, comprising about 70 vol % 660 equivalent weight perfluorosulfonic acid and about 30 vol % polyphenylsulfone (PPSU), was fabricated and characterized. The dual fiber electrospinning method as disclosed in the application was utilized for the fabrication of the membrane, where the two polymers were simultaneously electrospun into a dual-fiber mat. Follow-on processing converted the mat into a fully dense and functional fuel cell ion-exchange membrane with polyphenylsulfone nanofibers embedded in an ionomer matrix. The proton conductivity of the composite membrane was high, e.g., about 0.070 S/cm at about 80° C. and about 50% relative humidity. The dimensional stability of the membrane upon water uptake was excellent, with an in-plane (areal) swelling of only about 5% in room temperature water. In this example, PPSU, which is an uncharged polymer, is used as the first polymer, and 3M660 ionomer, which is a charged polymer, is used as the second polymer. The melting (or softening and flowing) process of the 3M660 ionomer includes compressing and thermal annealing processes. The characteristics of the fabricated membrane are shown in FIGS. 7A-10.

High temperature/low humidity fuel cell operation is desirable for automotive hydrogen/air fuel cells. High temperature operation (i.e. higher than 100° C.) allows for faster electrode kinetics and minimizes catalyst poisoning, but feed gas humidification is more difficult, requiring pressurization of feed gases which decreases system efficiency [1, 2]. Thus, high-temperature/low-humidity fuel cell operation is highly desirable. While the benchmark PEM, DuPont's Nafion® perfluorosulfonic acid, has proven to perform adequately at temperatures up to 80° C. at high humidity, it cannot operate at harsher hot and dry conditions. Nafion®'s proton conductivity dramatically decreases at high temperature and low humidity because there is insufficient water content to deprotonate sulfonic acid sites and to form water filled channels through which protons migrate during conduction [3].

One approach to increasing the high-temperature/low-humidity fuel cell operating range of perfluorosulfonic acid (PFSA) materials and other fuel cell ionomers is to increase the polymer ion-exchange capacity (IEC) above that of Nafion® (which has an IEC of 0.91 meq/g). High IEC materials have more fixed-charge acidic functional groups and are more hydrophilic, thus allowing for a higher proton conductivity under low relative humidity conditions. 3M Company, for example, has synthesized a series of high IEC PFSA polymers with equivalent weights (EWs) in the 580-825 range. The 580 EW material (an IEC of 1.72 meq/g) is highly conductive, with a proton conductivity of 0.146 S/cm at 120° C. and 50% RH vs. 0.039 S/cm for Nafion® [4]. Similarly, highly sulfonated poly(p-phenylene sulfone) films with IEC of 4.5 meq/g were found to be very good proton conductors, with a conductivity seven-times higher than that of Nafion® at 135° C. and 35% RH [5]. Unfortunately, most/all high IEC proton conducting polymers suffer from one or more problems associated with: (i) membrane brittleness when dry, (ii) water solubility (especially in high temperature water), and (iii) dimensional stability (i.e., excessive swelling/shrinking in the wet/dry states) [6-8]. Methods to alleviate one or more of these problems include ionomer crosslinking, blending, and the use of block copolymers.

Nanofiber electrospinning methods have been employed to fabricate fuel cell proton conducting membranes with a high ion-exchange capacity and improved/lower water swelling [9-13]. These composite membranes were prepared, by electrospinning ionomer into a porous nanofiber mat and then impregnating an uncharged/hydrophobic polymer into the interfiber void space. Such an approach decouples the properties of the proton conducting ionomer from the uncharged polymer which provides mechanical strength to the membranes and improves the membrane's dimensional stability. Ionomers such as 1.21 meq/g and 1.36 meq/g PFSA (from 3M Company) and 2.1-2.5 meq/g sulfonated polysulfone were electrospun into porous nanofiber mats with fiber diameters <200 nm. The mats were compressed to increase the ionomer fiber volume fraction and then impregnated with Norland Optical Adhesive 63 (NOA63), a polyurethane liquid pre-polymer which was subsequently UV-crosslinked in-situ to create a mechanically robust reinforcing matrix that surrounded every ionomer fiber. Highly sulfonated polyhedral oligomeric silsesquioxane (sPOSS, with an IEC of 4.8 meq/g) was added to PFSA nanofibers to further increase the proton conductivity. Thus, a membrane including 1.21 meq/g PFSA+sPOSS nanofibers embedded in a NOA63 matrix had a proton conductivity of 0.107 S/cm at 120° C. and 50% RH with half the in-plane dimensional swelling of a neat PFSA/sPOSS film [14].

In an effort to eliminate the polymer impregnation step during nanofiber composite membrane fabrication, the inventor Pintauro and co-worker developed a membrane fabrication strategy based on dual nanofiber electrospinning [15]. Nafion® and uncharged polyphenylsulfone (PPSU) are simultaneously electrospun from separate syringes onto a common collecting surface. The resulting dual-fiber mat is then processed in one of two ways: (1) the PPSU material is allowed to soften and flow to fill the void space between Nafion® nanofibers or (2) the Nafion® polymer softens and flows around the PPSU web. In both cases, no polymer impregnation is needed and the final membrane (either Nafion® nanofibers embedded in a PPSU matrix or a PPSU nanofiber mat reinforcing Nafion®) was found to be fully dense and defect free. The final membranes had an excellent combination of properties in terms of proton conduction and dimensional stability (e.g. the proton conductivity decreased in proportion to the volume fraction of PPSU in the membrane but the in-plane water swelling dropped by a factor of 5).

Figure 7A:
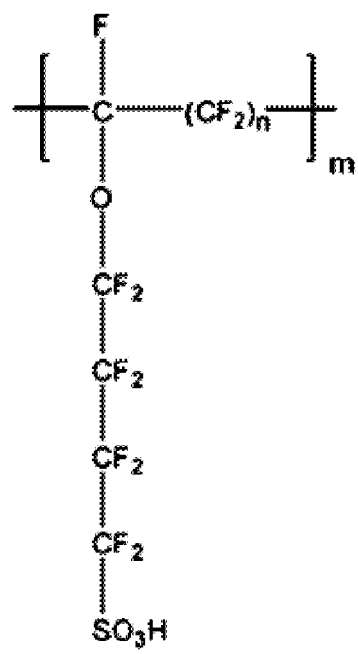
FIG. 7A shows schematically the chemical structure of 660 equivalent weight perfluorosulfonic acid according to one embodiment of the present invention.
Figure 7B:
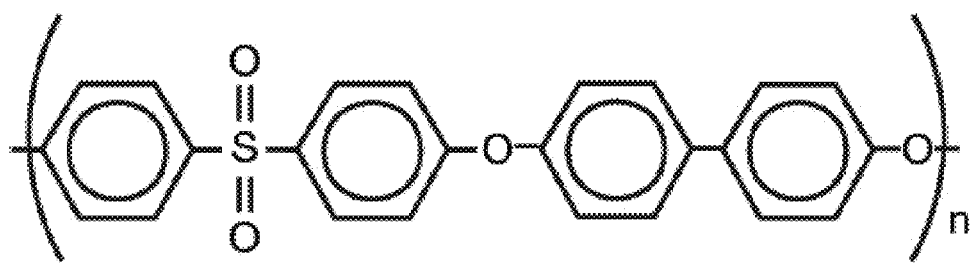
FIG. 7B shows schematically the chemical structure of polyphenylsulfone (PPSU) according to one embodiment of the present invention.

In this example, the use of the dual-fiber electrospinning technique to fabricate composite membranes of 3M Company's 660 equivalent weight ionomer (IEC=1.52 meq/g), hereinafter referred to as 3M660, and polyphenylsulfone (PPSU). The chemical structure of 3M660 is shown in FIG. 7A, where n=6.66, and the chemical structure of PPSU is shown in FIG. 7B. The two polymers were simultaneously electrospun into a dual-fiber electrospun mat with follow-on processing that allowed for the softening and flow of the 3M660 ionomer into the PPSU interfiber void space. The resulting membrane morphology was a 3M660 film reinforced by a mat of PPSU nanofibers. The final membrane was found to have excellent properties (proton conductivity and dimensional stability) for high temperature fuel cell applications.

PFSA polymers do not form true solutions, but rather micellar dispersions in organic solvents [18]. Thus, PFSA lacks the requisite chain entanglements for electrospinning and a carrier polymer must be added to improve electrospinnability, as described elsewhere [11, 12, 15, 16]. In this example, 1,000 kDa MW polyethylene oxide (PEO) was used as the carrier polymer.

3M660 and PEO solutions were prepared separately by dissolving 3M660 powder (from an evaporated liquid solution that was provided to us by 3M Company) and PEO powder (Sigma-Aldrich) into a mixed solvent of 2:1 wt. ratio n-propanol:water. The solutions were then combined where PEO constituted 0.3% of the total polymer weight.

PPSU (Radel R 5500NT from Solvay Advanced Polymers LLC) solutions were prepared by dissolving polymer in an 80:20 wt. ratio n-methyl-2-pyrrolidone:acetone solvent. The PPSU solution and 3M660/PEO solutions were drawn into separate syringes and electrospun using 22 gauge needles (Hamilton Company) onto a common rotating drum collecting surface. Electrospinning conditions are summarized in Table 4. The total electrospun volume of each polymer component fixed the composition of the final membrane. In the present study the nanofiber mat was composed of 70 vol % PFSA and 30 vol % PPSU.

TABLE 4

Electrospinning conditions for 3M660/PPSU dual-fiber mat.

| Parameter | 3M660 | PPSU |
|---|---|---|
| Polymer Comp. | 99.7:0.3, 3M660:PEO (30 wt % total polymer in solution) | 25 wt % |
| Solvent | n-propanol:water in a 2:1 wt. ratio | NMP:acetone in a 8:2 wt. ratio |
| Voltage | 7.0 kV | 7.5 kV |
| SCD | 5.5 cm | 8.5 cm |

An electrospun dual-fiber mat (where 70% of the fibers are PFSA) was compressed at about 15,000 psi and 127° C. for about 10 seconds. The sample was rotated 90° three times and successively compressed to ensure even compression. The mat was then annealed in vacuum at 150° C. for 2 hours. During annealing, the 3M660 softened and flowed to fill the interfiber void space between PPSU fibers, as has been first reported in the reference [17] for Nation PFSA/PEO dual fiber mats. The membranes were then soaked in 1M $H_2SO_4$ for 16 hours and liquid water for 6 hours to ensure full protonation of sulfonic acid sites and the removal (leaching) of PEO from the membrane.

Figure 8B:
FIG. 8B shows a SEM micrograph of a freeze-fracture cross-section of a dense 3M660/PPSU nanofiber composite membrane where 3M660 has been softened and allowed to flow between PPSU fibers according to one embodiment of the present invention.
Figure 8A:
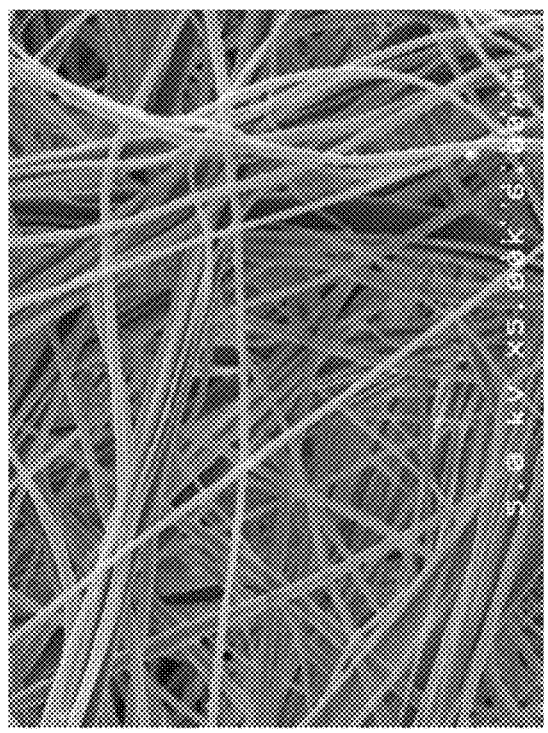
FIG. 8A shows a SEM micrograph of an electrospun dual-fiber mat of 3M660/poly(ethylene oxide) (PEO) fibers and PPSU fibers.

The SEM images of the surface of a dual-fiber electrospun mat are shown in FIGS. 8A and 8B, where the scale bars of the SEM images are 6 μm. The 3M660/PEO fibers and the PPSU fibers are visually indistinguishable by SEM, but 70% of the fibers are composed of 3M660/PEO, as determined by later IEC experiments. The average fiber diameter for the mat is 335 nm. The fiber mat was processed into a dense membrane by hot-pressing and annealing, at 150° C. for 2 hours. The cross-section of a densified/annealed membrane is shown in FIG. 8B. The PFSA has softened and flowed into the PPSU inter-fiber void space. The membrane structure is similar to that in reference [17], with a 3M660 EW PFSA matrix reinforced by a nonwoven nanofiber mat of PPSU fibers. PFSA flow during nanofiber mat annealing has been observed by several investigators [11, 17]. The PFSA flow is attributed to morphological re-arrangements of the ionic domains above the a-transition temperature, as suggested by Moore and coworkers [18, 19].

Following densification/annealing, the membrane was soaked in 1M $H_2SO_4$ and water to ensure full protonation of all sulfonic acid fixed-charge sites and to remove any residual PEO from the membrane. Removal of PEO from the membrane is important for some applications; previous studies have shown that small amounts of PEO in PFSA reduce the ionomer conductivity, whereas acid and water treatments effectively extract PEO with full recovery of proton conductivity [11]. The amount of PEO within the membrane in the present studies was very small (0.3 wt %, as compared to the ionomer) and thus its removal from the membrane did not have any visible or structural effect on the membrane (i.e. PEO removal did not leave any defect voids in the final membrane). Fully processed membranes were typically 40-60 μm in dry thickness.

Figure 9:
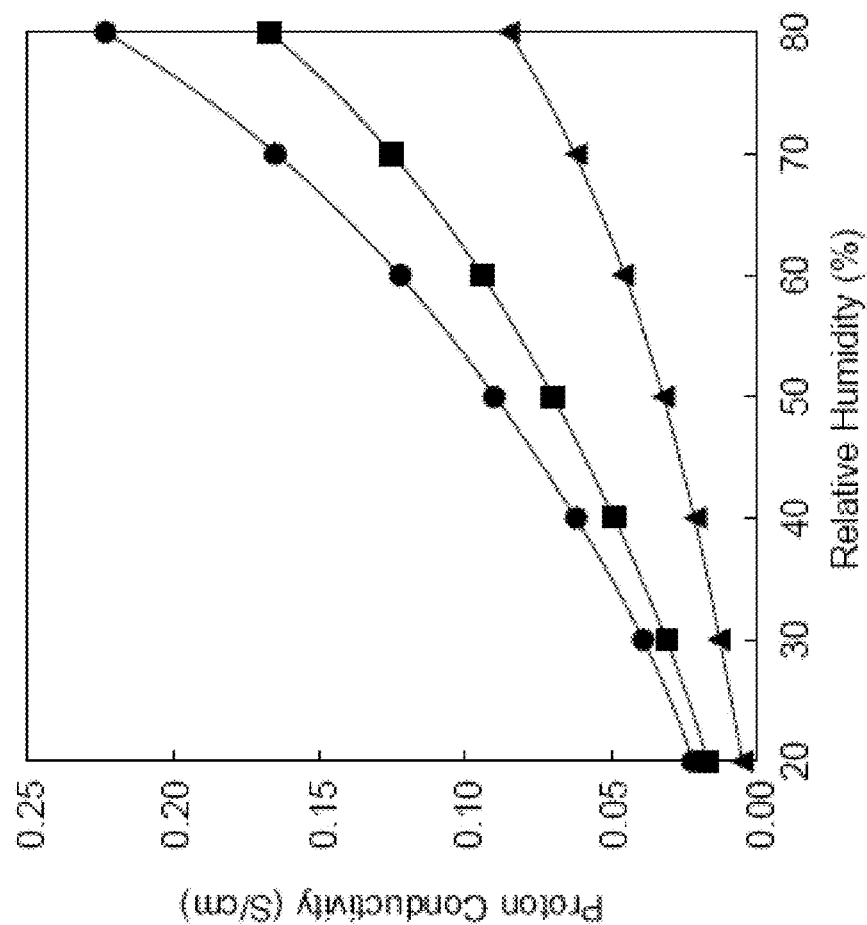
FIG. 9 shows a chart of in-plane proton conductivity as a function of relative humidity at 80° C. according to one embodiment of the present invention.

FIG. 9 shows a chart of in-plane proton conductivity as a function of relative humidity at 80° C. according to one embodiment of the present invention. In FIG. 9, the curve marked with (●) represents the in-plane proton conductivity of Solution-cast 3M660 membrane, the curve marked with (■) represents the in-plane proton conductivity of 3M660/PPSU composite membrane, and the curve marked with (▲) represents the in-plane proton conductivity of Nafion® 212 membrane. The resulting 3M660/PPSU dense membrane has a high concentration of fixed charge sulfonic acid groups; the IEC was 1.23 meq/g, corresponding to a 3M660 membrane mass fraction of 0.81 and a membrane volume fraction of 0.70. The additional number of charge carriers, as compared to Nafion®, result in a proton conductivity that is significantly higher than commercial Nafion® 212, as shown in FIG. 9, where proton conductivity is plotted as a function of relative humidity at 80° C. Over the entire 20-80% humidity range, the conductivity of the EW660 nanofiber composite membrane was twice that of Nafion®. The composite's conductivity is lower than a neat solution-cast 3M660 film due to dilution of sulfonic acid groups with PPSU. Thus, at 80° C. and 50% RH the composite has a conductivity of 0.070 S/cm compared to 0.032 S/cm for Nafion® and 0.090 S/cm for 3M660.

Figure 10A:
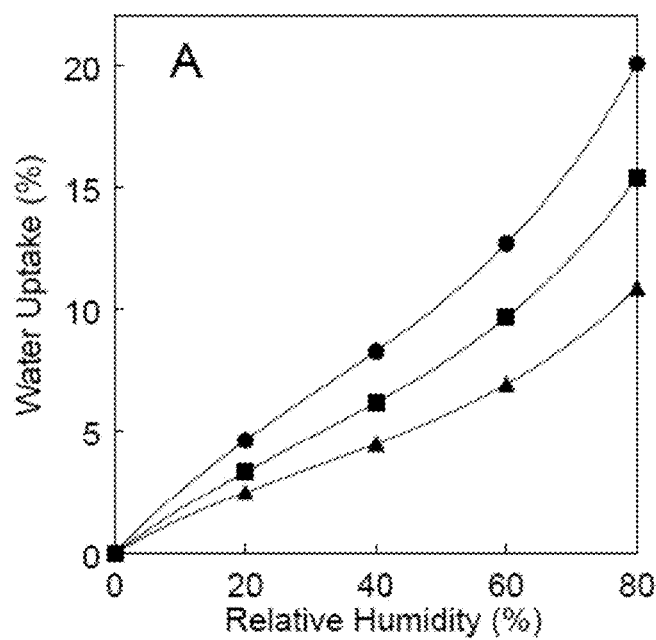
FIGS. 10A and 10B show charts of membrane water uptake as a function of relative humidity at 80° C. according to one embodiment of the present invention, where
Figure 10B:
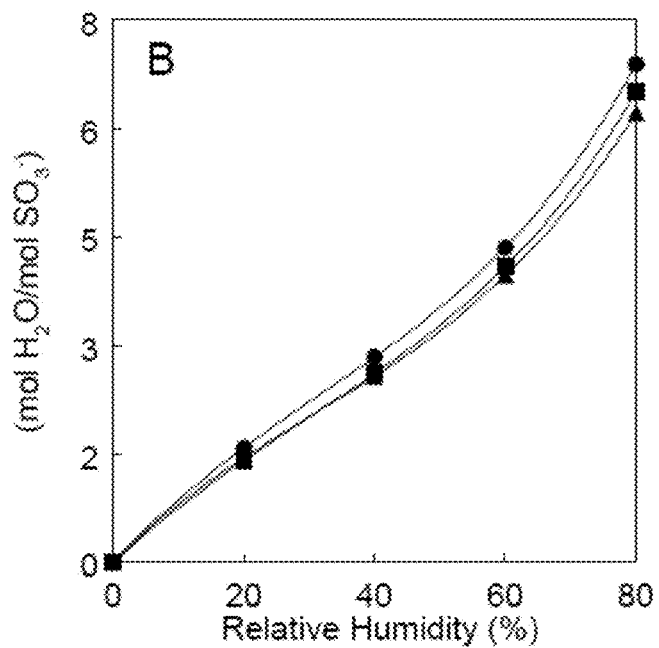

FIGS. 10A and 10B show charts of membrane water uptake as a function of relative humidity at 80° C. according to one embodiment of the present invention, where (a) shows gravimetric water uptake and (b) shows water molecules per sulfonic acid group. In FIGS. 10A and 10B, the curve marked with (●) represents the membrane water uptake of Cast 3M 660 membrane (IEC of 1.51 meq/g), the curve marked with (■) represents the membrane water uptake of 3M660/PPSU composite membrane (effective IEC of 1.23 meq/g), and the curve marked with (▲) represents the membrane water uptake of Nafion® 212 membrane (IEC of 0.91 meq/g). High IEC films are more hydrophilic than ionomer films with a lower IEC. The increased concentration of acidic functional groups increases the osmotic driving force for membrane water swelling. As seen in FIG. 10A, gravimetric water uptake is a strong function of the effective membrane IEC. A cast film of 3M660 (IEC of 1.51 meq/g) sorbs more water than the 3M660/PPSU composite film (IEC of 1.23 meq/g), which sorbs more than commercial Nafion® 212 (IEC of 0.91 meq/g). Since the PPSU component of the nanofiber composite does not contain acidic functional groups and does not sorb water, there is a reduction in both IEC and water sorption for nanofiber composites as compared to a neat film of 3M660. While there is significantly higher water uptake for the neat 3M660 film, the number of water molecules per sulfonic acid site is constant, regardless of the IEC and the PFSA polymer type (Nafion® vs. PFSA), as shown in FIG. 10B.

High water content with minimal changes in areal swelling is an important membrane property for fuel cell applications [7, 8]. High water content is required for high proton conductivity whereas low in-plane swelling (as opposed to out-of-plane or thickness swelling) is highly desirable for increasing the useful lifetime of a fuel cell membrane during on/off cycling [20, 21]. The 3M660/PPSU composite membrane exhibited excellent dimensional stability, with an area swelling that is lower than a neat 3M660 film and even lower than commercial Nafion® (see Table 5). The low in-plane swelling is attributed to the absence of through-plane connectivity of the PPSU fibers, which allows the membrane to swell predominantly in the thickness direction upon water sorption, as discussed elsewhere [14].

TABLE 5

Membrane swelling and proton conductivity in room temperature water for a nanofiber composite membrane (70 vol % 660 EW PFSA matrix and 30 vol % PPSU fibers), a neat film of 3M 660EW polymer, and Nafion ® 212.

| Membrane | Mass Swelling [%] | Volumetric Swelling [%] | In-Plane Swelling [%] | Proton Conductivity [mS/cm] |
|---|---|---|---|---|
| 660EW/PPSU Composite | 53 | 87 | 5 | 107 |
| Cast 660 EW film | 71 | 137 | 84 | 132 |
| Nafion ® 212 | 16 | 35 | 25 | 95 |

According to the exemplary embodiment, membranes with high proton conductivity and low in-plane water swelling have been fabricated using the dual nanofiber electrospinning approach of the invention. 3M660 equivalent weight perfluorosulfonic acid polymer and polyphenylsulfone were simultaneously electrospun into a dual fiber mat with an average fiber diameter of 335 nm. Follow-on processing induced flow of the 3M660 polymer, resulting in a final membrane morphology where the 3M660 ionomer was reinforced by a nonwoven polyphenylsulfone nanofiber mat. The 3M660 component of the membrane imparted high conductivity to the membrane; the composite film had over twice the conductivity of commercial Nafion® at 80° C. and 50% RH. The polyphenylsulfone nanofibers reduced the volumetric, gravimetric, and in-plane water swelling of the composite membrane relative to a neat film of 3M660 ionomer, with a lower areal swelling than Nafion® 212. The combination of high proton conductivity and low planar swelling make this composite membrane an excellent candidate for long-term, high-temperature fuel cell operation.

Example Five

The exemplary embodiments of the invention provide composite membranes fabricated by an electrospun multi fiber mat approach. In the multi fiber mat approach, one or more types of polyelectrolyte solutions (or polyelectrolyte precursors, or a combination of polyelectrolytes and precursors) and one or more types of uncharged (or minimally charged) polymer solutions are separately and simultaneously electrospun to form a dual or multi fiber mat of one or more types of polyelectrolyte fibers and one or more types of uncharged (or minimally charged) polymer fibers. Then, the dual or multi fiber mat is processed by softening and flowing at least one of the one or more types of polyelectrolyte fibers to fill in the void space between the one or more types of uncharged (or minimally charged) polymer fibers, or by softening and flowing at least one of the one or more types of uncharged (or minimally charged) polymer fibers to fill in the void space between the one or more types of polyelectrolyte fibers, so as to form the composite membrane. That is, during the mat processing, at least one of the polyelectrolyte fibers is softened and flown, while keeping at least one of the uncharged polymer nanofiber networks of the mat intact, or at least one of the uncharged polymer nanofibers are softened and flown, while keeping at least one of the polyelectrolyte fiber networks intact.

An example of a multi-fiber mat composed of Nafion®, PPSU and PVDF nanofibers (the latter two nanofibers being uncharged). PVDF has shown very good chemical stability in membranes but it does not have good mechanical properties. Thus, the PPSU nanofibers can be used to strengthen the PVDF, i.e., during the mat processing, only is the PVDF softened and flows around both the Nafion® nanofibers and the PPSU nanofibers. Accordingly, the PPSU is protected from possible chemical attack by the surrounding PVDF and the PVDF matrix is strengthen by the presence of the embedded PPSU nanofibers. Meanwhile, the Nafion® nanofiber network remains intact and provides pathways for ion/proton conduction. Such composite membranes made by the approach are AEMs or PEMs.

In sum, the present invention, among other things, recites composite membranes, such as PEMs or AEMs, methods of fabricating the same, and its corresponding applications. The composite membranes are fabricated from dual or multi fiber/nanofiber mats of one or more first-type electrospun polymer fibers and one or more second-type electrospun polymer fibers, by softening and flowing at least one of the one or more of the first-type polymer fibers to fill in the void space between the one or more second-type polymer fibers, or by softening and flowing at least one of the one or more of the second-type polymer fibers to fill in the void space between the one or more first-type polymer fibers. The one or more first-type polymer fibers comprise charged polymer fibers, e.g., polyelectrolyte fibers, or charged polymer precursor fibers, and the one or more second-type polymer fibers comprise uncharged polymer fibers. In addition, the composite membranes according to embodiments of the invention include multilayered structures, where the relative amounts of polyelectrolyte fibers and uncharged polymer matrix differs in the membrane thickness direction. Moreover, according to embodiments of the invention, one of the fiber types in the composite membranes is cross-linked after electrospinning.

Example Six

Figure 11:
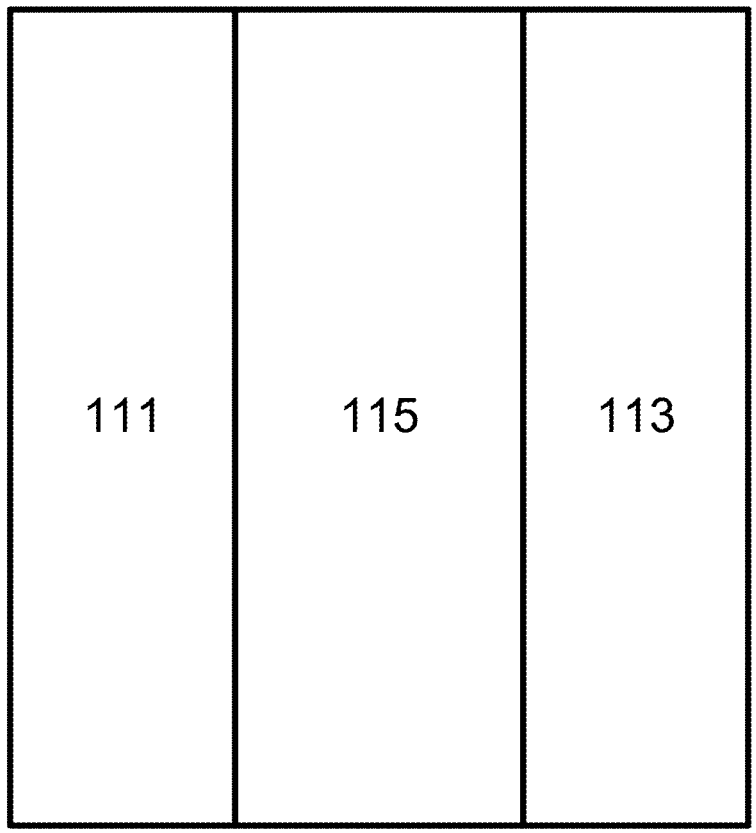
FIG. 11 schematically shows a membrane-electrode-assembly (MEA) formed according to one embodiment of the present invention.

FIG. 11 schematically shows a membrane-electrode-assembly (MEA) formed according to one embodiment of the present invention. Referring to FIG. 11, an MEA 110 is shown according to one embodiment of the present invention. The MEA 110 in use may be incorporated into an electrochemical device, for example, a proton exchange membrane (PEM) fuel cell. The MEA 110 has an anode electrode 111, a cathode electrode 113, and a membrane 115, where the anode electrode 111 and the cathode electrode 113 are respectively attached to the opposing surfaces of the membrane 115. In the MEA, one or both electrodes 111 and/or 113 are formed of electrospun nanofibers, and the membrane 115 contains electrospun nanofibers. Embodiments of the nanofiber membrane and the nanofiber electrodes and their fabrications are respectively disclosed as described above. The following description summarizes only the key features of the nanofiber membrane and the nanofiber electrodes and their fabrications.

The membrane 115 is an ion and proton conductor. In one embodiment, the membrane 115 is the composite membrane as described above, which may include nanofibers of an uncharged polymer surrounded by a matrix of a proton conducting polymer, or nanofibers of a proton conducting polymer surrounded by a matrix of an uncharged polymer.

In one embodiment, the membrane 115 includes a fiber network, formed from a dual or multi fiber mat of one or more first polymer fibers and one or more second polymer fibers; and a polymer matrix encompassing the fiber network, where the polymer matrix is formed by softening and flowing at least one of the one or more of the first polymer fibers of the dual or multi fiber mat to fill in the void space between the one or more second polymer fibers of the dual or multi fiber mat, or by softening and flowing at least one of the one or more of the second polymer fibers of the dual or multi fiber mat to fill in the void space between the one or more first polymer fibers of the dual or multi fiber mat. As described above, the one or more first polymer fibers are formed from a first solution having charged polymer or charged polymer precursor and a first uncharged polymer, and the one or more second polymer fibers are formed from a second solution having a second uncharged polymer.

In one embodiment, the membrane is fabricated by the following steps: At first, one or more first polymer solutions are formed from one or more charged polymer and a first uncharged polymer and one or more second polymer solutions formed from one or more second uncharged polymers, respectively. Next, the one or more first polymer solutions and the one or more second polymer solutions are electrospun, separately and simultaneously, to form a dual or multi fiber mat of one or more first polymer fibers and one or more second polymer fibers. Then, the dual or multi fiber mat is processed by softening and flowing at least one of the one or more first polymer fibers to fill in the void space between the one or more second polymer fibers, or by softening and flowing at least one of the one or more second polymer fibers to fill in the void space between the one or more first polymer fibers, so as to form the membrane.

In one embodiment, the processing step includes the steps of compressing the dual or multi fiber mat; and thermal annealing the dual or multi fiber mat to soften and flow at least one of the one or more first polymer fibers to fill in the void space between the one or more second polymer fibers.

In another embodiment, the processing step includes the steps of compressing the dual or multi fiber mat; and exposing the dual or multi fiber mat to solvent vapor to soften and flow at least one of the one or more second polymer fibers to fill in the void space between the one or more first polymer fibers. In one embodiment, the processing step further includes the steps of thermal annealing the dual or multi fiber mat.

In one embodiment, each of the anode and cathode electrodes includes a catalyst. In one embodiment, the catalyst includes platinum-supported carbon (Pt/C).

In one embodiment, at least one of the anode electrode and the cathode electrode is formed of nanofibers by electrospinning of a polymer solution containing the catalyst and an ionomer or an uncharged (or minimally charged) polymer. In one embodiment, the ionomer or uncharged (or minimally charged) polymer includes Nafion®.

In one embodiment, each of the anode electrode and the cathode electrode is fabricated by forming a polymer solution containing the catalyst and the ionomer or an uncharged (or minimally charged) polymer; electrospinning the polymer solution to generate electrospun fibers so as to form a nanofiber mat; and pressing the nanofiber mat to fabricate the electrode.

In one embodiment, each of the anode and cathode electrodes may be coated on one side with a thin catalyst layer, and the anode and cathode electrodes are separated by a PEM. The MEA is disposed between two flow-field plates, and in operation, hydrogen and air or some other fuel and oxidant are provided to the electrodes of the MEA via channels that are formed in the flow field plates. More particularly, one flow-field plate directs hydrogen to the anode and another flow-field plate directs oxygen in the air to the cathode. At the anode, a catalyst layer facilitates separation of the hydrogen into protons and electrons. Free electrons produced at the anode are conducted as a usable electric current through an external circuit. At the cathode, hydrogen protons that have passed through the PEM come together with oxygen in air and electrons that return from the external circuit, to form water and heat.

The fuel cell MEA may also have a first gas diffusion layer disposed between the anode electrode and the membrane; and a second gas diffusion layer disposed between the cathode electrode and the membrane. In one embodiment, the first and second gas diffusion layers are formed of electrospun nanofibers.

In one embodiment, a first entirely electrospun fuel cell MEA has been fabricated (e.g., a fuel cell MEA containing an electrospun anode, an electrospun cathode and an electrospun membrane). The electrospun membrane has been shown to provide enhanced fuel cell durability relative to commercial Nafion® films, while the electrospun electrodes have been shown to provide enhanced fuel cell power output and durability, as compared to conventional/benchmark "decal" electrodes [22, 23]. Thus, the combination of these two materials into a single MEA has considerable advantages over current fuel cell MEA technologies (i.e., decal electrodes on a commercial Nafion® membrane or catalyst coated gas diffusion layers that are hot pressed onto a proton conducting membrane).

In certain embodiments, the electrospun MEA (E-MEA) was constructed by separately preparing an electrospun membrane and electrospun electrodes (anode and cathode) and then hot-pressing the components into a single MEA construct. However, according to the invention, the fuel cell MEA can also be fabricated by forming a first electrospun nanofiber electrode; sequentially forming a electrospun nanofiber membrane on the first electrospun nanofiber electrode; and sequentially forming a second electrospun nanofiber electrode on the electrospun nanofiber membrane to construct the fuel cell MEA, where one of the first and second electrospun nanofiber electrodes is an anode electrode, and the other of the first and second electrospun nanofiber electrodes is a cathode electrode. Additionally, In one exemplary embodiment, the membrane is formed such that a proton conducting polymer is reinforced by an electrospun nanofiber mat of an uncharged polymer. Variants of this construct, for example, a membrane is formed such that the uncharged polymer surrounds an electrospun mat of proton conducting nanofibers, or one electrode (e.g., the anode) contains no nanofiber in structure, can also be utilized to the practice the invention.

Example Seven

Here a single electrospun blended polymer fiber is converted into a dense film. The fiber can be composed of a blend of perfluoro imide acid (PFIA) or perfluorosulfonic acid (PFSA) and poly(vinylidene fluoride) (PVDF) or a PVDF copolymer. For this example, the fiber composition is 70 wt % PFIA and 30 wt % PVDF. The electrospinning solution is as follows: ionomer (PFIA) and PVDF in a solvent of DMF or DMAC, with a wt. % polymer of 20-25%. The electrospinning conditions are as follows (for a single needle spinneret and a rotating drum collector): relative humidity of 20-30%, needle-to-drum distance of 8 cm, voltage or 11-15 kV, and flow rate of 0.25 ml/min. The electrospun fiber mat can be used as a porous material or it can be further processed into a dense and defect-free membrane by hot-pressing at 30,000 psi and 188° C. for 2 minutes or at 30,000 psi and 170° C. for 2 minutes. The properties of the resulting membranes (proton conductivity in water, gravimetric water swelling and in-plane (lateral) water swelling) are listed in the Table 6.

TABLE 6

The properties of the resulting membranes.

| | Hot-press: Temperature & time | In-Plane Conductivity (S/cm) | Gravimetric Swelling (%) | Lateral Swelling (%) |
|---|---|---|---|---|
| Mat 1 | HP 170° C. 2 min | 0.083 | 18.4 | 13.0 |
| Mat 2 | HP 188° C. 2 min | 0.095 | 8.9 | 14 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCE LIST

[1] S. J. Hamrock, Yandrastis, Michael A., *Polymer Reviews*, 46, 219 (2006).
[2] X. L. Zhu, Yuxiu, Liu; Zhu, Lei, in *Polymer Membranes for Fuel Cells*, S. M. J. M. Zaidi, Takeshi Editor, Spring. Science+Business Media, LLC, New York (2009).
[3] K. D. Kreuer, *Journal of Membrane Science*, 185, 29 (2001).
[4] S. J. Hamrock, *DOE Annual Progres Report: Membranes and MEAs for Dry, Hot Operating Conditions*, in (2009).
[5] C. C. de Araujo, K. D. Kreuer, M. Schuster, G. Portale, H. Mendil-Jakani, G. Gebel and J. Maier, *Phys. Chem. Chem. Phys.*, 11, 3305 (2009).
[6] M. Schuster, C. C. de Araujo, V. Atanasov, H. T. Andersen, K. D. Kreuer and J. Maier, *Macromolecules*, 42, 3129 (2009).
[7] X. Y. Huang, R. Solasi, Y. Zou, M. Feshler, K. Reifsnider, D. Condit, S. Burlatsky and T. Madden, *J Polym. Sci. Pt. B-Polym. Phys.*, 44, 2346 (2006).
[8] H. Tang, S. Peikang, S. P. Jiang, F. Wang and M. Pan, *Journal of Power Sources*, 170, 85 (2007).
[9] J. Choi, K. M. Lee, R. Wycisk, P. N. Pintauro and P. T. Mather, *Macromolecules*, 41, 4569 (2008).
[10] J. Choi, K. M. Lee, R. Wycisk, P. N. Pintauro and P. T. Mather, *J Electrochem. Soc.*, 157, B914 (2010).
[11] J. Choi, K. M. Lee, R. Wycisk, P. N. Pintauro and P. T. Mather, *J Mater. Chem.*, 20, 6282 (2010).
[12] J. Choi, R. Wycisk, W. J. Zhang, P. N. Pintauro, K. M. Lee and P. T. Mather, *Chemsuschem*, 3, 1245 (2010).
[13] K. M. Lee, J. Choi, R. Wycisk, P. N. Pintauro and P. Mather, "Nafion Nanofiber Membranes", p. 1451, ECS (2009).
[14] J. B. Ballengee and P. N. Pintauro, "Nanofiber Composite Proton Exchange Membranes Fabricated by Dual-Fiber Electrospinning," *Advanced Functional Materials*, Submitted (2011).
[15] B. Loppinet, G. Gebel and C. E. Williams, *The Journal of Physical Chemistry B*, 101, 1884 (1997).
[16] J. B. Ballengee and P. N. Pintauro, *J Electrochem. Soc.*, 158, B568 (2011).
[17] H. Chen, J. D. Snyder and Y. A. Elabd, *Macromolecules*, 41, 128 (2008).
[18] S. J. Osborn, M. K. Hassan, G. M. Divoux, D. W. Rhoades, K. A. Mauritz and R. B. Moore, *Macromolecules*, 40, 3886 (2007).
[19] K. A. Page, F. A. Landis, A. K. Phillips and R. B. Moore, *Macromolecules*, 39, 3939 (2006).
[20] A. Kusoglu, A. M. Karlsson, M. H. Santare, S. Cleghorn and W. B. Johnson, *Journal of Power Sources*, 170, 345 (2007).
[21] A. Kusoglu, A. M. Karlsson, M. H. Santare, S. Cleghorn and W. B. Johnson, *Journal of Power Sources*, 161, 987 (2006).
[22] J. B. Ballengee and P. N. Pintauro, *Macromolecules*, 44, 7307 (2011).
[23] W. J. Zhang and P. N. Pintauro, *Chemsuschem*, 4, 1753 (2011).

What is claimed is:

1. A composite membrane, comprising:
a fiber network of first polymer fibers surrounded by a matrix formed from second polymer fibers or a fiber network of the second polymer fibers surrounded by a matrix formed from the first polymer fibers, wherein
the first polymer fibers are formed from a first solution, and the first solution comprises a charged polymer and a first uncharged polymer having a repeat unit of a formula of:

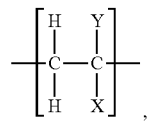

wherein each of X and Y is a non-hydroxyl group; and
the second polymer fibers are formed from a second solution, and the second solution comprises a second uncharged polymer,
wherein the second uncharged polymer is polyvinylidene difluoride (PVDF) or polyphenylsulfone (PPSU).

2. The composite membrane of claim 1, wherein the polymer matrix is formed by:
softening and flowing the first polymer fibers of a dual fiber mat formed by the first polymer fibers and the second polymer fibers, to fill void space between the second polymer fibers in the dual fiber mat; or
softening and flowing the second polymer fibers of the dual fiber mat formed by the first polymer fibers and the second polymer fibers, to fill void space between the first polymer fibers in the dual fiber mat.

3. The composite membrane of claim 1, wherein the charged polymer is selected from perfluorosulfonic acid (PFSA) polymer and perfluoro imide acid (PFIA) polymer.

4. The composite membrane of claim 1, wherein each of X and Y is fluoride, and the first uncharged polymer is polyvinylidene difluoride (PVDF) or a copolymer of PVDF.

5. The composite membrane of claim 1, wherein the dual fiber mat is formed by electrospinning, separately and simultaneously, the first solution and the second solution.

6. The composite membrane of claim 5, wherein the composite membrane is formed by processing the dual fiber mat, and the step of processing the dual fiber mat comprises:
compressing the dual fiber mat; and
soften and flow at least one of the first polymer fibers and the second polymer fibers to fill void space on the dual fiber mat.

7. A fuel cell comprising at least one composite membrane of claim 1.

8. A membrane-electrode-assembly (MEA) for an electrochemical device, comprising at least one composite membrane of claim 1.

* * * * *